US006912221B1

(12) United States Patent
Zadikian et al.

(10) Patent No.: US 6,912,221 B1
(45) Date of Patent: Jun. 28, 2005

(54) METHOD OF PROVIDING NETWORK SERVICES

(75) Inventors: H. Michael Zadikian, Manhattan Beach, CA (US); Steven E. Plote, Plano, TX (US); John C. Adler, Plano, TX (US); David P. Autry, Plano, TX (US); Ali Najib Saleh, Ft. Lauderdale, FL (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/477,498

(22) Filed: Jan. 4, 2000

Related U.S. Application Data

(63) Continuation-in-part of application No. 09/232,396, filed on Jan. 15, 1999.
(60) Provisional application No. 60/137,471, filed on Jun. 4, 1999.

(51) Int. Cl.[7] .......................... H04L 12/28; G01R 31/08; G06F 15/177; G06F 15/173
(52) U.S. Cl. .................. 370/395.21; 370/219; 370/397; 370/409; 709/226; 709/221
(58) Field of Search ............................. 370/395.1, 398, 370/397, 395.2, 395.21, 395.4, 395.42, 400, 406, 409, 230; 709/220, 221, 222, 224, 226, 235, 238, 239

(56) References Cited

U.S. PATENT DOCUMENTS

| | | | |
|---|---|---|---|
| 5,049,871 A | 9/1991 | Sturgis et al. | 370/224 |
| 5,093,824 A | 3/1992 | Coan et al. | 370/16 |
| 5,412,376 A | 5/1995 | Chujo et al. | 340/825.1 |
| 5,590,118 A | 12/1996 | Nederlof | 370/218 |

(Continued)

FOREIGN PATENT DOCUMENTS

| | | |
|---|---|---|
| EP | 0 781 068 A1 | 6/1997 |
| EP | 0 841 824 A2 | 5/1998 |

OTHER PUBLICATIONS

Hideki Sakauchi, et al., "A Self–Healing Network With An Economical Spare–Channel Assignment", Proceedings of the Globecom '90 IEEE Telecommunications Conference & Exhibition, vol. 1, 1991, pp. 438–443.

Baruch Awerbuch, et al., "Distributed Controls For PARIS", Proc. Annual ACM Symp. On Principles Of Distributed Computing, Aug. 22, 1999, pp. 145–159.

Sujai Hajela, "HP OEMF: Alarm Management In Telecommunications Networks", *Hewlett Packard Journal*, Oct., 1996, vol. 47, No. 5, pp. 22–30.

Ali Saleh; H. Michael Zadikian; Zareh Baghdasarian, Vahid Parsi, "A Method For Routing Information Over A Network", filed Jan. 15, 1999; U.S. Appl. No. 09/232,397.

(Continued)

*Primary Examiner*—Hanh Nguyen
(74) *Attorney, Agent, or Firm*—Campbell Stephenson Ascolese LLP

(57) ABSTRACT

A method of providing network services is described. The network includes a number of nodes, each one of which is coupled to at least one other of the nodes by at least one of a number of optical links. The network is preferably capable of supporting a number of virtual circuits. The method begins with the receiving of a request for a virtual circuit between a first node and a second node of the network. Preferably, the request specifies a quality of service of the virtual circuit. Next, the availability of network resources for supporting a virtual circuit at the requested quality of service is determined. Assuming sufficient network resources are available for support of the virtual circuit, the request is then serviced by provisioning (and maintaining) the requested virtual circuit. Servicing the request preferably includes actions such as provisioning, maintaining, and restoring the virtual circuit, using the requested parameters.

85 Claims, 16 Drawing Sheets

U.S. PATENT DOCUMENTS

| | | | | |
|---|---|---|---|---|
| 5,596,722 A | | 1/1997 | Rahnema | 395/200 |
| 5,646,936 A | | 7/1997 | Shah et al. | 370/228 |
| 5,687,167 A | | 11/1997 | Bertin et al. | 370/254 |
| 5,737,319 A | | 4/1998 | Croslin et al. | 370/255 |
| 5,781,528 A | | 7/1998 | Sato et al. | 370/218 |
| 5,805,578 A | | 9/1998 | Stirpe et al. | 370/255 |
| 5,805,593 A | | 9/1998 | Busche | 370/396 |
| 5,835,696 A | | 11/1998 | Hess | 395/182.08 |
| 5,884,297 A | | 3/1999 | Noven | 707/1 |
| 5,920,257 A | | 7/1999 | Commerford | 340/506 |
| 5,933,425 A | * | 8/1999 | Iwata | 370/351 |
| 5,959,972 A | | 9/1999 | Hamami | 370/228 |
| 5,987,526 A | | 11/1999 | Morales | 709/249 |
| 5,999,286 A | | 12/1999 | Venkatesan | 359/117 |
| 6,011,780 A | | 1/2000 | Vaman et al. | 370/237 |
| 6,041,037 A | | 3/2000 | Nishio et al. | 370/228 |
| 6,041,049 A | | 3/2000 | Brady | 370/351 |
| 6,075,766 A | | 6/2000 | Croslin | 370/225 |
| 6,075,775 A | | 6/2000 | Ueki | 370/248 |
| 6,097,696 A | | 8/2000 | Doverspike | 370/216 |
| 6,097,722 A | * | 8/2000 | Graham et al. | 370/395.21 |
| 6,115,753 A | | 9/2000 | Joens | 709/242 |
| 6,130,876 A | | 10/2000 | Chaudhuri | 370/228 |
| 6,130,881 A | | 10/2000 | Stiller et al. | 370/238 |
| 6,134,671 A | | 10/2000 | Commerford et al. | 714/4 |
| 6,154,778 A | * | 11/2000 | Koistinen et al. | 709/228 |
| 6,222,653 B1 | | 4/2001 | Asahi | 359/110 |
| 6,259,673 B1 | * | 7/2001 | Yoshihara et al. | 370/238 |
| 6,272,107 B1 | | 8/2001 | Rochberger et al. | 370/216 |
| 6,282,170 B1 | | 8/2001 | Bentall et al. | 370/225 |
| 6,292,464 B1 | | 9/2001 | Elahmadi et al. | 370/223 |
| 6,301,244 B1 | * | 10/2001 | Huang et al. | 370/351 |
| 6,324,162 B1 | | 11/2001 | Chaudhuri | 370/225 |
| 6,347,078 B1 | * | 2/2002 | Narvaez-Guarnieri et al. | 370/230 |
| 6,370,119 B1 | | 4/2002 | Basso et al. | 370/252 |
| 6,400,681 B1 | | 6/2002 | Bertin et al. | 370/218 |
| 6,457,050 B1 | | 9/2002 | Cowan et al. | 709/224 |
| 6,463,062 B1 | | 10/2002 | Buyukkoc et al. | 370/395.1 |
| 6,504,845 B1 | | 1/2003 | Petersen et al. | 370/412 |

OTHER PUBLICATIONS

Ali Saleh, "A Method For Path Selection In A Network", filed Jan. 4, 2000; U.S. Appl. No. 09/478,235.

Ali N. Saleh and Stevan E. Plote, "A Network Addressing Scheme For Reducing Protocol Overhead In An Optical Network", filed Sep. 2, 1999; U.S. Appl. No. 09/389,302.

Ali Saleh, H. Michael Zadikian; John C. Adler, Zareh Baghdasarian, Vahid Parsi, "Configurable Network Router", filed Jan. 15, 1999; U.S. Appl. No. 09/232,395.

Ali N. Saleh, Douglas E. Duschatko, Lane Byron Quibodeaux, "Method And Apparatus For A Rearrangeably Non–Blocking Switching Matrix", filed Jan. 4, 2000; U.S. Appl. No. 09/477,166.

H. Michael Zadikian, Ali Saleh; John C. Adler, Zareh Baghdasarian, Vahid Parsi, "A Resource Management Protocol For A Configurable Network Router", filed Jan. 4, 2000; U.S. Appl. No. 60/174,323.

Ronald Alan Russell and Michael Kevin Anthony, "A Method And Apparatus For Isolating Faults In A Switching Matrix", filed Jan. 4, 2000; U.S. Appl. No. 09/477,217.

H. Michael Zadikian, Ali Saleh, John C. Adler, Zareh Baghdasarian, Vahid Parsi, "A Method of Allocating Bandwidth in an Optical Network" (as amended), filed Jan. 15, 1999, U.S. Appl. No. 09/232,396.

The ATM Forum Technical Committee, "Interim Inter–switch Signaling Protocol (IISP) Specification v1.0", af–pnni–0026.000, Dec. 1994, pp. 1–34.

The ATM Forum Technical Committee, Private Network–Network Interface Specification Version 1.0 (PNNI 1.0), afpnni–0055.000, Mar. 1996, pp. v–xviii, pp. 19, 1–366.

The ATM Forum Technical Committee, Private Network–Network Interface Specification Version 1.0 Addendum (Soft PVC MIB), af–pnni–0066.000, Sep. 1996.

The ATM Forum Technical Committee, Addendum to PNNI V1.0 for ABR parameter negotiation, af–pnni–0075.000, Jan. 1997.pp. 2.3.

The ATM Forum Technical Committee, PNNI V1.0 Errata and PICS, af–pnni–0081.000, May 1997, pp. 2–224.

J. Moy, "OSPF Version 2", Ascend Communications, Inc., Apr. 1998.

K. Murakami, et al., "A MAPOS version 1 Extension— Switch–Switch Protocol", NTT Laboratories, Jun. 1997.

F. Baker, et al., "OSPF Version 2 Management Information Base", Cisco Systems, Nov. 1995.

F. Baker, et al., "PPP Bridging Control Protocol (BCP)", IBM, Jun. 1994.

E. Decker, "Definitions of Managed Objects for Bridges", Cisco Systems, Inc., Jul. 1993.

* cited by examiner

METHOD OF PROVIDING NETWORK SERVICES

CROSS-REFERENCES TO RELATED APPLICATIONS

This application is a continuation-in-part of patent application Ser. No. 09/232,396, filed Jan. 15, 1999, and entitled "METHOD OF ALLOCATING BANDWIDTH IN AN OPTICAL NETWORK," having H. M. Zadikian, A. N. Saleh, J. C. Adler, Z. Baghdasarian, and V. Parsi as inventors. This application is hereby incorporated by reference, in its entirety and for all purposes.

This application also claims priority from a Provisional Patent Application No. 60/137,471, filed Jun. 4, 1999, and entitled "METHOD OF PROVIDING NETWORK SERVICES," having H. M. Zadikian, S. E. Plote, J. C. Adler, D. P. Autry, and A. Saleh as inventors. This application is hereby incorporated by reference, in its entirety and for all purposes.

This application is related to patent application Ser. No. 09/232,397, filed Jan. 15,1999, and entitled "A METHOD FOR ROUTING INFORMATION OVER A NETWORK," having A. N. Saleh, H. M. Zadikian, Z. Baghdasarian, and V. Parsi as inventors; patent application Ser. No. 09/232,395, filed Jan. 15, 1999, and entitled "A CONFIGURABLE NETWORK ROUTER," having H. M. Zadikian, A. N. Saleh, J. C. Adler, Z. Baghdasarian, and V. Parsi as inventors; patent application Ser. No. 60/174,323, filed herewith, and entitled "A RESOURCE MANAGEMENT PROTOCOL FOR A CONFIGURABLE NETWORK ROUTER" having H. M. Zadikian, A. Saleh, J. C. Adler, Z. Baghdasarian and V. Parsi as inventors; patent application Ser. No. 09/477,166, filed herewith, and entitled "METHOD AND APPARATUS FOR A REARRANGEABLY NON-BLOCKING SWITCHING MATRIX," having D. Duschatko and R. Klecka as inventors; patent application Ser. No. 09/477,217, filed herewith, and entitled "FAULT ISOLATION IN A SWITCHING MATRIX," having H. M. Zadikian, R. A. Russell, J. C. Adler, Z. Baghdasarian and V. Parsi as inventors; patent application Ser. No. 09/389,302, filed Sep. 2, 1999, and entitled "NETWORK ADDRESSING SCHEME FOR REDUCING PROTOCOL OVERHEAD IN AN OPTICAL NETWORK," having A. Saleh and S. E. Plote as inventors; and patent application Ser. No. 09/478,235, filed herewith, and entitled "A METHOD FOR PATH SELECTION IN A NETWORK," having H. M. Zadikian, A. Saleh, J. C. Adler, Z. Baghdasarian, and V. Parsi as inventors. These related applications are hereby incorporated by reference, in their entirety and for all purposes.

BACKGROUND OF THE INVENTION

1. Field of the Invention

This invention relates to the field of information networks, and more particularly relates to the provision of network services.

2. Description of the Related Art

Today's networks carry vast amounts of information. High bandwidth applications supported by these networks include streaming video, streaming audio, and large aggregations of voice traffic. In the future, these bandwidth demands are certain to increase. To meet such demands, an increasingly popular alternative is the use of lightwave communications carried over fiber-optic cables. The use of lightwave communications provides several benefits, including high bandwidth, ease of installation, and capacity for future growth.

The synchronous optical network (SONET) protocol is an example of the protocols employing an optical infrastructure. SONET is a physical transmission vehicle capable of transmission speeds in the gigabit range, and is defined by a set of electrical as well as optical standards. SONET's ability to use currently-installed fiber-optic cabling, coupled with the fact that SONET significantly reduces complexity and equipment functionality requirements, gives local and interexchange carriers incentive to employ SONET. Also attractive is the immediate savings in operational cost that this reduction in complexity provides.

SONET networks have traditionally been protected from failures by using topologies that dedicate something on the order of half the network's available bandwidth for protection, such as a ring or mesh topology. Two approaches in common use today are diverse protection and self-healing rings (SHR), both of which offer relatively fast restoration times with relatively simple control logic but do not scale well for large data networks. This is mostly due to their inefficiency in capacity allocation. Their fast restoration time, however, makes most failures transparent to the end-user, which is important in applications such as telephony and other voice communications. The existing schemes rely on 1-plus-1 and 1-for-1 topologies that carry active traffic over two separate fibers (line switched) or signals (path switched), and use a protocol (Automatic Protection Switching or APS), or hardware (diverse protection) to detect, propagate, and restore failures.

An alternative to the ring topology is the mesh topology. The mesh topology is similar to the point-to-point topology used in internetworking. Each node in such a network is connected to one or more other nodes. Thus, each node is connected to the rest of the network by one or more links. In this manner, a path from a first node to a second node uses all or a portion of the capacity of the links between those two nodes.

Networks based on mesh-type restoration are inherently more capacity-efficient than ring-based designs, mainly because each network link can potentially provide protection for fiber cuts on several different links. By sharing the capacity between links, a SONET network using a mesh topology can provide redundancy for failure restoration at less than, and often substantially less than, 100% of the bandwidth capacity originally required. Such networks are even more efficient when traffic transits several links. Unfortunately, mesh topologies have exhibited relatively long restoration times, often on the order of 10 minutes or more.

The provision of services using such networks has historically been found wanting, however, due in part to the physical limitations of such networks. Users of such networks have only limited options when requesting service, and normally must contend with some or all of the following: long delays in the provisioning of service, increased costs associated with the large amounts of redundant bandwidth required, relatively long restoration times, and other such disadvantages.

SUMMARY

The present invention overcomes conventional limitations by providing services in a flexible and efficient manner. By employing a network element such as is described herein, the present invention allows a service provider to offer services to a customer that can be tailored to that customer's needs. A user can request one of several levels of service, from the premium to the basic, by defining their needs.

Parameters used in defining a level of service include: initiation (provisioning), availability, latency, and restoration.

Various embodiments of the present invention employ a network that allows a service provider to automatically allocate bandwidth between two of a number of nodes in a network in response to a request by an end-user. The circuit provisioned and maintained between the two is referred to herein as a virtual path (VP), which is provisioned on a physical path. It will be noted that the terms virtual path and virtual circuit, and the terms physical path and physical circuit are used interchangeably herein, the latter (respectively) emphasizing the circuit-switched nature of a network capable of supporting the present invention. It will also be noted that the term virtual wavelength path may be used to describe a virtual path provisioned using wavelengths of light.

According to one embodiment of the present invention, a method of providing network services is described. The network includes a number of nodes, each one of which is coupled to at least one other of the nodes by at least one of a number of optical links. The network is preferably capable of supporting a number of virtual circuits. The method begins with the receiving of a request for a virtual circuit between a first node and a second node of the network. Preferably, the request specifies a quality of service of the virtual circuit. Next, the availability of network resources for supporting a virtual circuit at the requested quality of service is determined. Assuming sufficient network resources are available for support of the virtual circuit, the request is then serviced by provisioning (and maintaining) the requested virtual circuit. Servicing the request preferably includes actions such as provisioning, maintaining, and restoring the virtual circuit, using the requested parameters.

The requested virtual circuit's quality of service is defined by a set of parameters that can include, for example, a provisioning time, a latency time, a level of availability, and at least one restoration parameter. The provisioning time indicates the time in which the virtual circuit is to be provisioned. The latency time parameters indicates the time within which information is to be communicated between the first and the second nodes. The level of availability indicates the times at which the virtual circuit will be available for use, while the restoration parameters indicate the level of service required when restoring the virtual circuit, in the event of a failure in the network affecting the virtual circuit. The set of parameters can also include parameters such as a requested bandwidth, a requested maximum length, a requested maximum number of hops, and the like.

The latency time can assume one of a number of values, such as a least possible latency time, a minimum available latency time, or a maximum latency time. The least possible latency time is the lowest latency time that the network can possibly provide. The minimum available latency time is the lowest latency time that the network can provide without deprovisioning any of the virtual circuits already provisioned thereon, while the maximum latency time is the longest time The level of availability can include, for example, an up-time parameter and a scheduling parameter. The up-time parameter specifies at least one period of time during which the virtual circuit is available for use. Values for the up-time parameter can include a guaranteed availability value (availability for a substantial portion of the times designated by the scheduling parameter) and a best-efforts availability (availability for at least a minimum portion of the times designated by the scheduling parameter). The scheduling parameter can specify, for example, a schedule of times at which and dates on which the virtual circuit will exist and will be available for use.

The restoration parameter includes one or more of a restoration time, a restored latency time, and a restoration priority. The restoration time being a time within which the virtual circuit is to be restored in response to a failure in the network affecting the virtual circuit. The restored latency time being a latency time to be exhibited by the virtual circuit once the virtual circuit is restored in response to the failure.

The restored latency time can assume one of a number of values, including a least possible restored latency time, a minimum available restored latency time, and a best-effort restored latency time. The least possible restored latency time is the lowest latency time that the network is configured to provide. The minimum available restored latency time is the lowest latency time that the network can provide without deprovisioning any of the presently-configured virtual circuits. The best-effort restored latency time is a latency that is simply under some maximum value, which may be as long as (or even longer than) the time required to physically install one or more new optical links and/or nodes.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION

The following is intended to provide a detailed description of an example of the invention and should not be taken to be limiting of the invention itself. Rather, any number of variations may fall within the scope of the invention which is defined in the claims following the description.

In addition, the following detailed description has been divided into sections, subsections, and so on, to highlight the various subsystems of the invention described herein; however, those skilled in the art will appreciate that such sections are merely for illustrative focus, and that the invention herein disclosed typically draws its support from multiple sections. Consequently, it is to be understood that the division of the detailed description into separate sections is merely done as an aid to understanding and is in no way intended to be limiting.

The discussion that follows is divided into two sections. The first section describes a network element (referred to herein as a "router") which can serve as the basis for an exemplary network in which a method according to the present invention can be practiced. The second section describes a method according to the present invention. A router such as that described below supports a method according to the present invention by providing relatively fast restoration times, control over quality-of-service, relatively high bandwidth, and, optionally, relatively fast provisioning times. Using these and other characteristics of such a network, a method according to the present invention is able to provide varying levels of service using different combinations of these characteristics.

Figure 1A:
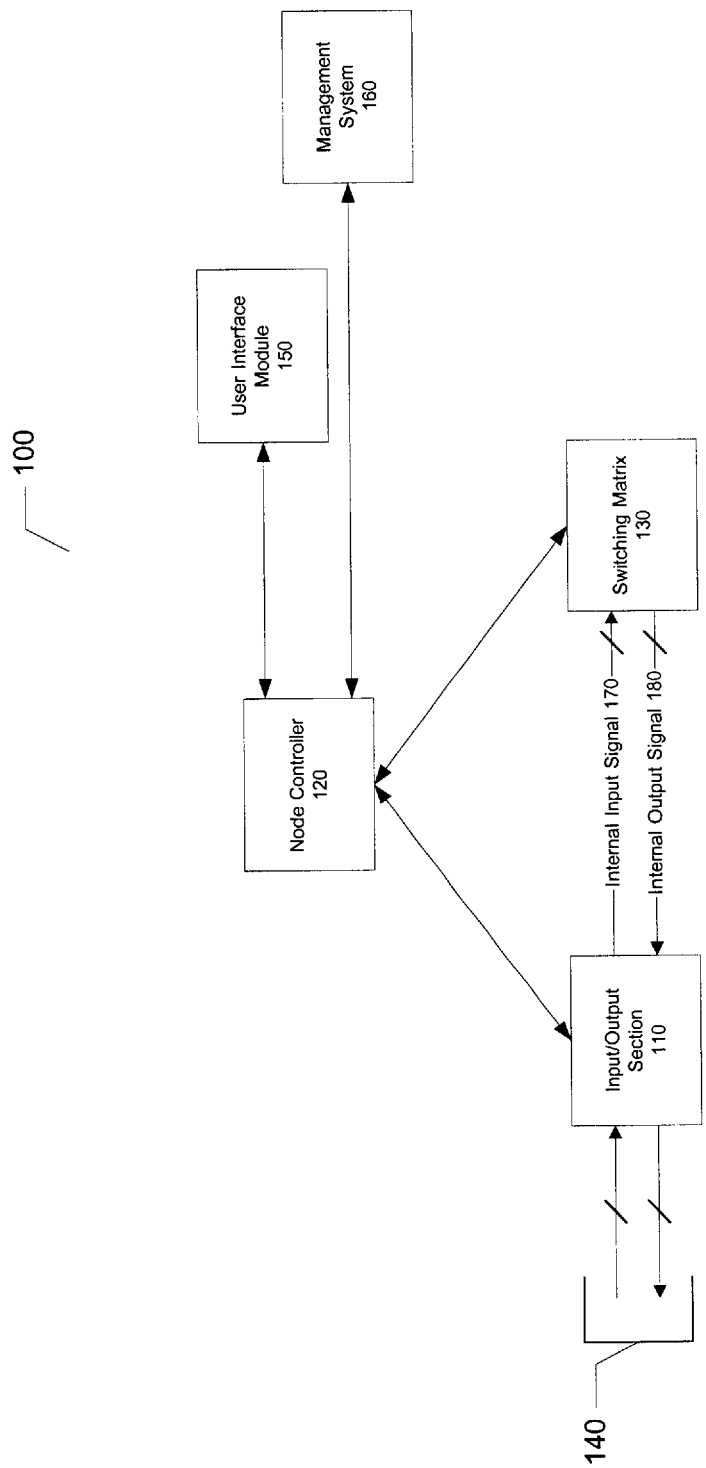
FIG. 1A is a block diagram of an exemplary router.
Figure 1B:
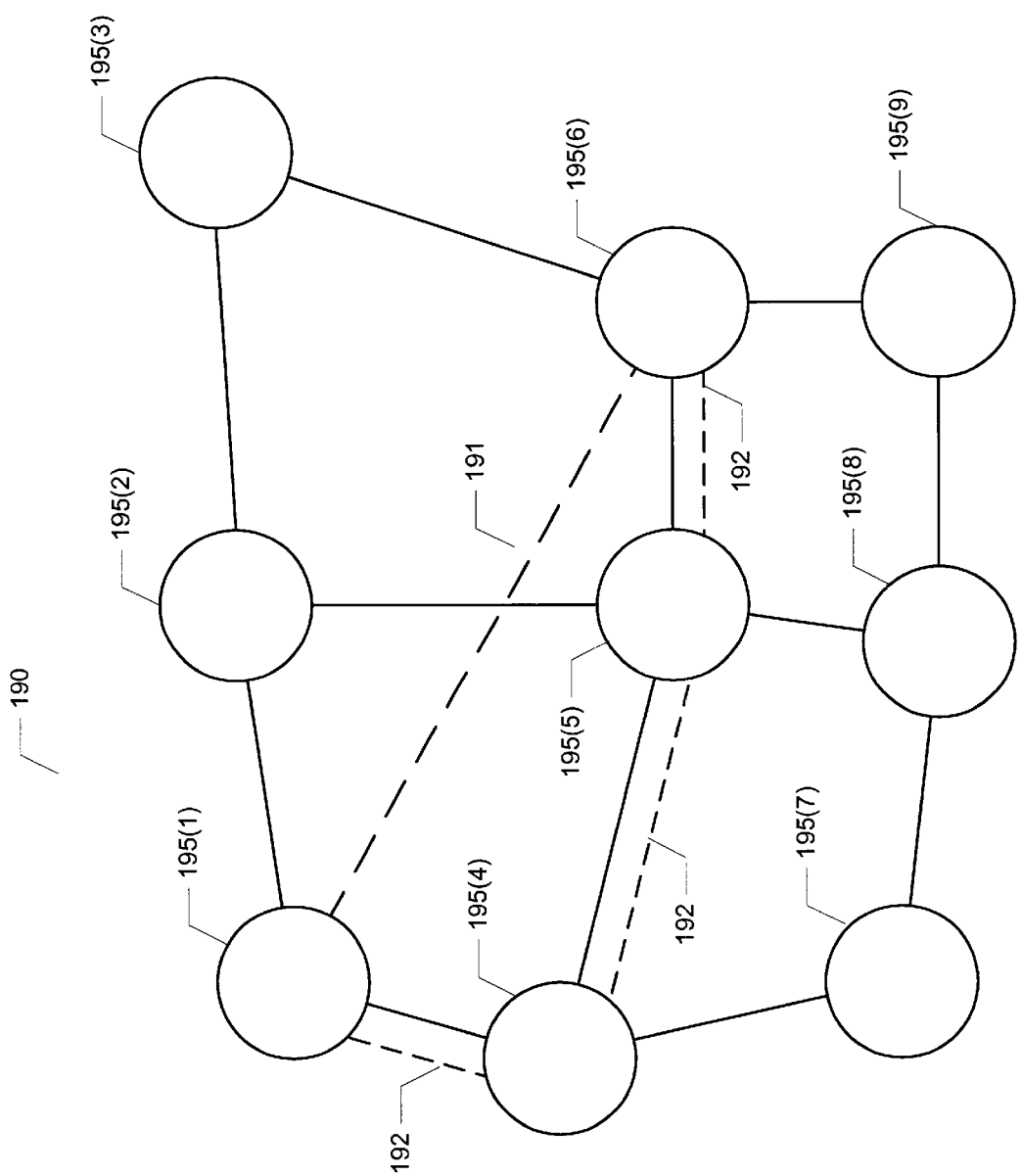
FIG. 1B is a block diagram of a network including a number of the routers of Fig. 1A.

I. An Exemplary Network Element and Network Capable of Supporting Provisioning of Network Services FIG. 1A illustrates a router 100. Router 100 includes an input/output section 110, a node controller 120, and a switching matrix 130. Node controller 120 contains, for example, real time software and intelligent routing protocols (not shown). Router wavelength 100 supports interfaces including, but not limited to, optical signal interfaces (e.g., SONET), a user interface module 150, and a management system 160. Internal input signals 170 and internal output signals 180 may be electrical or optical in nature. FIG. 1B illustrates a network 190 that includes a number of nodes, network nodes 195(1)–(N). One or more of network nodes 195(1)–(N) can be a router such as router 100. Network 190 can thus support the automatic provisioning, testing, restoration, and termination of virtual paths (exemplified by a virtual path 191) over a physical path (exemplified by a physical path 192) from one of network nodes 195(1)–(N) to another of network nodes 195(1)–(N).

Among other benefits, router 100 solves three growth-related problems often encountered in today's information networks, and particularly in SONET networks:

1. Port Capacity growth: Router 100 includes, for example, a scaleable architecture which can provide a large number of ports at a relatively low cost and high density.
2. Bandwidth management: The distributed management architecture of one embodiment of exemplary router 100 allows some or all nodes in the network to be managed from a single workstation. Provisioning a new connection is easily accomplished by selecting the source and destination nodes and specifying the desired quality of service (QoS). Provisioning can take into consideration parameters such as existing trunk allocations, network status, the priority and desired quality of the new connection, and other such criteria.
3. Efficient and fast restoration: Exemplary network 190 preferably uses a mesh topology. Through the use of routers such as router 100, such a network can use bandwidth more efficiently than the existing ring topologies previously described. While providing the efficient bandwidth utilization of a mesh topology, a router such as router 100 is capable of supporting the restoration of a majority of network failures within less than 50 ms, thus providing the fast restoration times of rings topologies. A protocol, such as that according to the related patent application entitled "A METHOD FOR ROUTING INFORMATION OVER A NETWORK" (as previously referenced) can be run on such a router and encompasses all aspects of the restoration process: alarm gathering, path implementation (including alternate path discovery), and path assurance. In cases where there is insufficient bandwidth to satisfy all failed connections, the protocol, in one embodiment, uses a quality of service (QoS) metric to prioritize the restoration sequence. In such embodiment, connections with the highest QoS are restored first, followed, in a descending order, by those with a lower QoS, until either all connections have been restored or all available bandwidth has been used.

Router 100 is a multi-rack, fully redundant router that, in one embodiment, supports at least 256, 1+1 I/O ports, and provides 1-plus-1 protection by using multiple copies (e.g., two or more) of group and main matrices operating in 1+1 mode. Failures within one copy of a given matrix do not require a complete switchover to the backup copy. Only the affected paths through the matrix are switched to the backup copy. This greatly improves switching speed and minimizes the impact of such redundancy on other connections. Preferably, the group matrix is a 2:1 reduction stage that selects output signals from one of two line cards (also referred to herein as I/O modules, due to their functionality) and connects the selected output signals to the main matrix, thus preventing non-working channels from consuming any ports on the main matrix.

In one embodiment, there are at least three types of processors in a router 100. The lowest level, level-3, resides on the line card and is responsible for all real time aspects of the processing of the physical protocol (e.g., SONET). In a SONET implementation, every level-3 processor is responsible for a single optical signal (e.g., an OC-48 signal) and, via a protocol processor, performs all required SONET/SDH section and line termination functions. The fast response time required from the level-3 processor makes a firmware implementation preferable. The firmware, which may be written in the "C" or "C++" programming languages, assembler, or other programming language, is preferably optimized for low latency and resource efficiency. Higher-level processing is implemented on a separate module, the shelf processor module, which is shared by several line cards.

The second level of processors, level-2, reside on a shelf and main matrix processor modules. The software on the shelf processor module is responsible for managing and controlling line cards. Only half the line cards supported are active at any one time to support 1+1 protection. A level-2 processor deals with tasks that require a reasonable response time (for example, on the order of milliseconds), but have no direct impact on the data path. In other words, missed events, such as hardware interrupts, do not result in bit errors. Some of the functions handled by the shelf processor include the periodic collection of maintenance data from the line cards, receiving and processing periodic keep-alive messages from those cards, shelf startup and configuration, proxy management, and other related functions.

The third processor level, level-1, resides on a system processor module and provides system-wide management and control services. In one embodiment, there are preferably two fully synchronous copies of the level-1 processor in the system, both of which are simultaneously active and, through a dedicated and redundant high-speed link, keep their run-time and stored databases fully synchronized. One of the two processors is designated the master and is responsible for all level-1 processing. An update message is sent to the second processor whenever a change is made to the database and before that change is effected. A periodic keep-alive mechanism allows. either copy of the system controller to detect failures on the other copy.

Router 100 provides yet another type of processor, referred to herein as a route processor. Such a processor is dedicated to the path/route discovery and restoration functions. The route processor is responsible for receiving failure indications from the line cards, calculating a new route for failed connections, and sending reconfiguration requests to all affected nodes, including its own.

Hardware Architecture

In one embodiment, router 100 is a multi-rack communications system capable of terminating at least 8192 signals and cross-connecting at least 4096 OC-48 signals. Such a router can be used, for example, as SONET/SDH line terminating equipment (LTE) capable of terminating the Section and Line overheads of received OC-48 signals, and cross-connects those signals according to provisioned input-output mappings. Some of the terminated signals can optionally be protected using any of the common protection schemes (1+1, 1:1, and 1:N).

Overhead processing and generation is performed on the line card by a protocol processor. This protocol processor handles all aspects of the SONET protocol, including framing, insertion and extraction of embedded data channels, error checking, AIS detection, pointer processing, clock recovery, multiplexing/duplexing, and similar duties.

Signal Path

Figure 2:
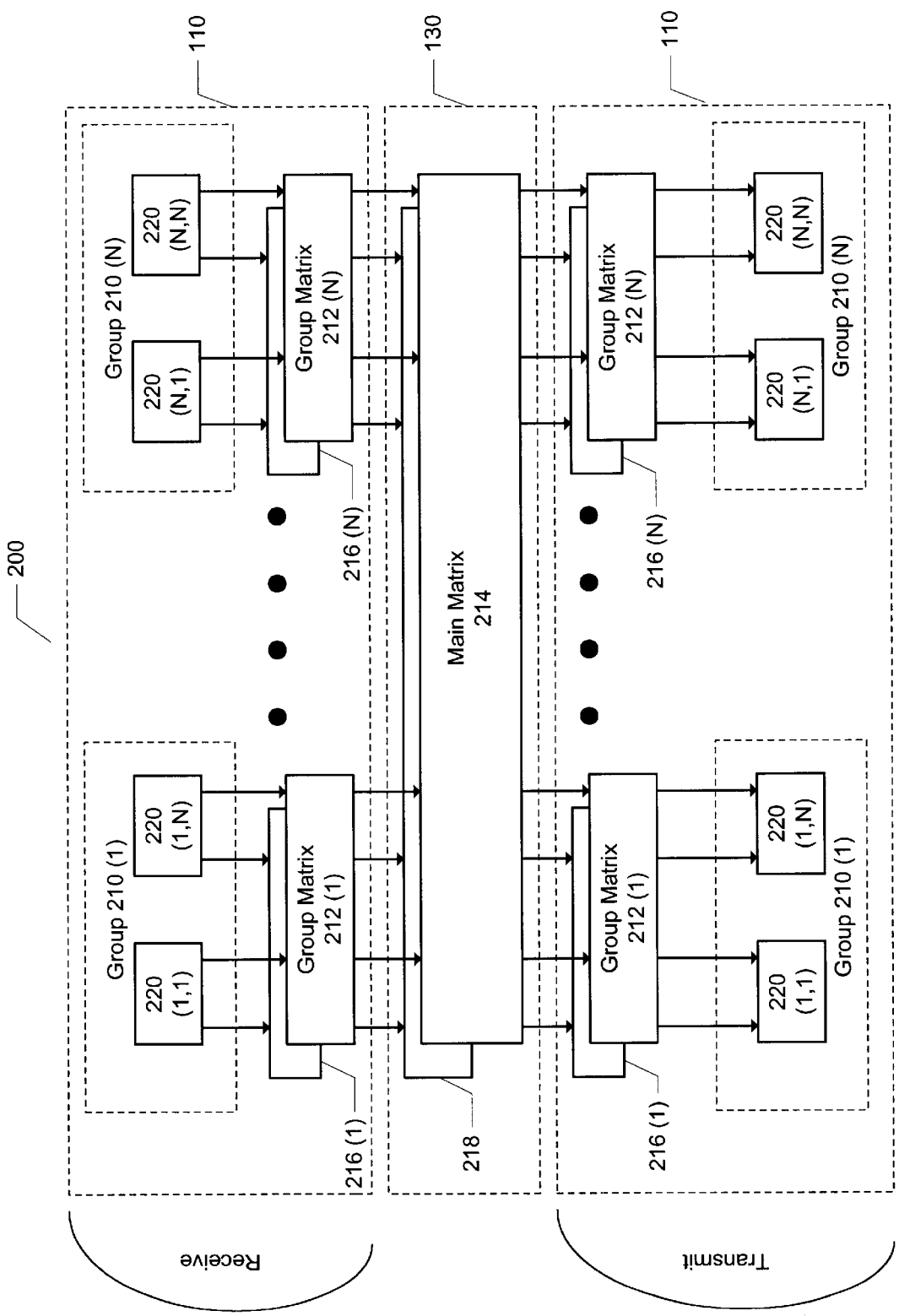
FIG. 2 is a block diagram of the signal paths and functional blocks of the router of FIG. 1A.
Figure 3:
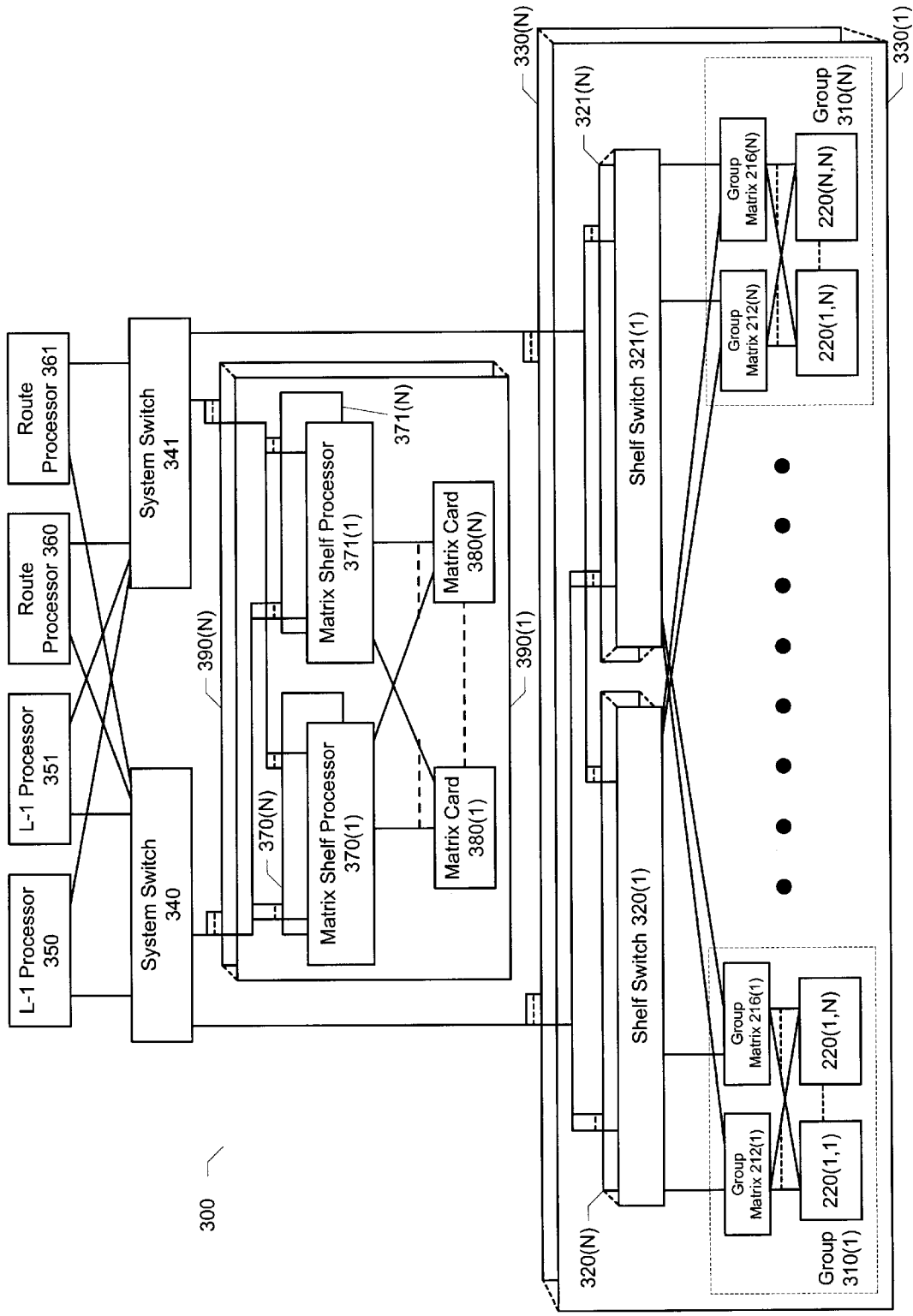
FIG. 3 is a block diagram of the control paths of the router of FIG. 1A.

FIG. 2 is a block diagram of signal paths 200 within router 100. The primary signal paths in router 100 include one or more groups exemplified by groups 210(1)–(N), group matrices 212(1)–(N), and a main matrix 214. As depicted in FIG. 1, groups 210(1)–(N), and group matrices 212(1)–(N) are shown as having receive and transmit sections. Groups 210(1)–(N) each include line cards 220(1,1)–(1,N), through line cards 220(N,1)–(N,N). Signals from line cards 220(1,1)–(N,N) are sent to the corresponding group matrix. In one embodiment, two sets of the group matrix cards, group matrices 212(1)–(N) and group matrices 216(1)–(N) are employed. Main matrix 214 is also mirrored in one embodiment by a redundant copy, a backup main matrix 218, which together form switching matrix 130. As shown in FIG. 3, the redundancy for group matrices 212(1)–(N) (i.e. group matrices 216(1)–(N)), is also provided on the transmit side.

NOTE: The variable identifier "N" is used in several instances in FIG. 3 (and subsequent use of other variables, such as "m,""x,""k," and others) to more simply designate the final element (e.g., group matrix 212(N), line card 220(N,N), and so on) of a series of related or similar elements (e.g., group matrices 212(1)–(N), line cards 220 (1,1)–(N,N), and so on). The repeated use of such variable identifiers is not meant to imply a correlation between the sizes of such series of elements. The use of such variable identifiers does not require that each series of elements has the same number of elements as another series delimited by the same variable identifier. Rather, in each instance of use, the variable identified by "N" (or "m,""x,""k," and others) may hold the same or a different value than other instances of the same variable identifier. For example, group matrix 212(N) may be the tenth group matrix in a series of group matrices, whereas line card 220(N,N) may be the forty-eighth line card in a series of line cards.

Using signal paths 200 as an example, data enters the system at one of line cards 220(1,1)–(N,N). It is at this point, in a SONET-based system, that the Section and Line overheads are processed and stripped off by a protocol processor (not shown). The extracted SONET/SDH payload envelope is then synchronized with the system clock and sent to two different copies of a local matrix, depicted as group matrices 212(1)–(N) and 216(1)–(N) in FIG. 1. In one embodiment, group matrices 212(1)–(N) and 216(1)–(N) are used mainly as 2:1 reduction stages that select one of two optical signals and pass the selected optical signal to switching matrix 130. This allows the implementation of a variety of protection schemes (including 1:N, or 0:1) without having to use any additional ports on main matrix 214. All protect signals are terminated at group matrices 212(1)–(N) and 216(1)–(N). In order to maximize bandwidth, it is preferable that only active signals be passed through to switching matrix 130.

In one embodiment, switching matrix 130 is an errorless, rearrangeably non-blocking switching network. In one embodiment, switching matrix 130 is a 256×256 switching network that consists of three columns and 16 rows of 16×16 switching elements that allow any of their inputs to be connected to any of their outputs. Also, preferably a single copy of the matrix is housed in a single rack that contains three shelves, one for each column (or stage) of the matrix. Each shelf contains cards housing the 16 switching elements in each stage. The switching element itself may include, for example, a 16×16 crosspoint switch, with optical transceivers, and a microcontroller for controlling the crosspoint switch and providing operational feedback to the level-2 processor. Communications between the two processors may be carried, for example, over an Ethernet connection. The level-2 processor in turn communicates with the level-1 and route processors using, for example, a redundant Ethernet connection.

The switching elements in each matrix copy of the exemplary embodiment may be connected using fiber-optic cables, for example. While copper cabling may also be employed, such an option may not offer the speed and number of connections provided by an optical arrangement. After passing through the stages of switching matrix 130, an optical signal may be routed to an I/O shelf that (optionally) splits the optical signal into two signals. One of the signals is sent to an active line card, while the other, when available, is sent to a backup card.

Line cards 220(1,1)–(N,N) receive optical signals from group matrices 212(1)–(N) and 216(1)–(N) which are in turn connected to two separate copies of the main matrix. Line cards 220(1,1)–(N,N) monitor both signals for errors and, after a user-defined integration period, switch to the backup signal if that signal exhibits better bit error rate (BER) performance than the prior active signal. This scheme, referred to herein as 1-plus-1, allows line cards 220(1,1)–(N,N) to select between the two copies of the group matrix without any level-1 or level-2 CPU intervention. This helps to ensure that such a switch can be made in 50 ms or less (per Bellcore's recommendations in GR-253 (GR-253: *Synchronous Optical Network (SONET) Transport Systems*, Common Generic Criteria, Issue 2 [Bellcore, Dec. 1995], included herein by reference, in its entirety and for all purposes)). The selected signal is then processed by the transmit section of the protocol processor, which inserts all required transport overhead bytes into the outgoing stream.

Regarding the signals described herein, both above and subsequently, those skilled in the art will recognize that a signal may be directly transmitted from a first logic block to a second logic block, or a signal may be modified (e.g., amplified, attenuated, delayed, latched, buffered, inverted, filtered or otherwise converted, etc.) between the logic blocks. Although the signals of the embodiments described herein are characterized as transmitted from one block to the next, other embodiments may include modified signals in place of such directly transmitted signals with the informational and/or functional aspect of the signal being transmitted between blocks. To some extent, a signal input at a second logic block may be conceptualized as a second signal derived from a first signal output from a first logic block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not substantively change the informational and/or final functional aspect of the first signal.

Control Path

FIG. 3 illustrates a control path 300 of a router, such as router 100. Control path 300 includes all non-payload-related flows within the system and the hardware and software necessary to the control of the signal paths illustrated in FIG. 2. All major control flows are carried over an internal local area network (LAN), which is, for example, a collection of switched Ethernet segments. The structure of the internal LAN is hierarchical and can be created using a mixture of 10 Mbps and 100 Mbps Ethernet segments, for example. Higher-speed segments (e.g., gigabit Ethernet) can be used as well.

Groups

At the bottom of the hierarchy is what is referred to herein as a group matrix, or a Group Ethernet Repeater in a system using Ethernet communications, and depicted in FIG. 3 as group matrices 212(1)–(N) and 216(1)–(N). Each one of group matrices 212(1)–(N) and 216(1)–(N), also referred to herein as a hub, a repeater, or concentrator, is a physical layer device and preferably supports a star network topology, such as the IEEE 802.3 10BASE-T networking standard. The redundant connections from line cards 220(1,1)–(N,N) in each of groups 310(1)–(N) are connected to two repeaters that reside on two separate copies of the group matrix module. Preferably, each one of line cards 220(1,1)–(N,N) supports two network ports (e.g., 10BASE-T Ethernet ports). The two sets of four signals from each port pass through a relay that selects one of them for connection to the LAN for purposes of redundancy. Groups 310(1)–(N) represent the first layer of the control bus hierarchy. Group matrices 212(1)–(N) and 216(1)–(N) are each controlled by a shelf processor (not shown, for the sake of clarity) and communicate with one of the shelf switches described below via LAN connections.

Shelf Ethernet Switch

FIG. 3 also illustrates certain features of router 100 pertaining to the relationship between shelf switches 320(1)–(N) and 321(1)–(N), and groups 310(1)–(N). Groups 310(1)–(N) are again shown, with regard to the control functions thereof. In this depiction of groups 310(1)–(N), line cards 220(1,1)–(N,N) are shown as being attached to networking devices, -indicated here as group matrices. Group matrices 212(1)–(N) and 216(1)–(N) may be, for example, multi-port Ethernet hubs running at 10 Mbps. Each of line cards 220(1,1)–(N,N) feed signals into two of group matrices 212(1)–(N) and 216(1)–(N). For example, line card 220(1,1) feeds received information to group matrix 212(1) and group matrix 216(1). Group matrices 212(1)–(N) and 216(1)–(N) each feed a signal into shelf switches 320(1)–(N) and 321(1)–(N) of FIG. 3. Shelf switches 320(1)–(N) and 321(1)–(N) are each controlled by a shelf processor (not shown for the sake of clarity) and communicate with one of the system switches (not shown, for the sake of clarity).

Shelf switches 320(1)–(N) and 321(1)–(N) are the next higher level of the control hierarchy in router 100, and are located on the shelf processor module (exemplified by line racks (330(1)–(N)). Each copy of shelf switches 320 (1)–(N) and 321(1)–(N) interconnects six connections from the three groups in each shelf, another connection from the shelf processor, and one connection from system switch 340(and 341). Shelf switches 320(1)–(N) and 321(1)–(N) can be implemented, for example, using an 8-port Ethernet configured to handle 10 Mbps Ethernet traffic and a single-port, dual-rate switch (e.g., 10 Mbps/100 Mbps Ethernet).

System Switch

The next level of the hierarchy is the system switch, of which there are two copies in each router. These are shown as system switches 340 and 341 in FIG. 3. This fully redundant scheme prevents failures on one switch from taking down the entire control bus. In one embodiment, a system switch manages connections from the following sources:

1. High-speed connection(s) from shelf switches 320(1)–(N) and 321(1)–(N);
2. High-speed connection(s) to higher-level processors (e.g., redundant level-1 processors 350 and 351, and redundant route processors 360 and 361); and
3. High-speed connection(s) to matrix shelf processors 370 (1)–(N) and 371(1)–(N) which, in turn, control matrix cards 380(1,1)–(1,N)), located in main matrix racks 390 (1)–(N).

It will be noted that main matrix 214 includes matrix cards 380(1,1)–(1,N), and that, more generally, main matrices 214 and 218 are included matrix racks 390(1)–(N)

System switches 340 and 341 are located in a management bay. As noted, the fully redundant switches manage connections from various router elements, such as I/O and matrix bays, level-1 processors, and route processors. Each of level-1 processors 350 and 351 and route processors 360 and 361 is preferably connected to system switches 340 and 341 using 100 Mbps Ethernet connections in a configuration that creates an expandable, efficient, and fully redundant control bus.

Physical Configurations and Modules

I/O Bay

An I/O bay can support, for example, a total of 16 slots. Slots may be logically divided into functional groups. In such an embodiment, four such functional groups are defined with three of the groups occupying five slots each. In that embodiment, the other group, which occupies a single slot can be configured to house the shelf processor. Thus, the I/O bay can contain line cards and group matrices which are controlled by shelf processors. These elements are exemplary of line cards 220 (1,1)–(N-N), group matrices 212 (1)–(N) and 216 (1)(N), shelf processors 320 (1)–(N) and 321 (1)–(N), and shelf switches 440(1)–(N). It will be noted that the various line cards, group matrices, and shelf processors correspond to similar elements from previous figures.

Groups

A group is made up of line cards occupying a number of slots on a shelf. In one implementation, the group is 20 line cards that occupy five slots. Four of the slots hold, for example, 16 line cards at 4 line cards per slot. The same slot can be used with a wide variety of line cards and in various configurations. This architecture provides flexibility to allow any combination of line cards to be installed in each slot.

The fifth slot in the aforementioned embodiment can be configured to accept line cards containing an optical switching matrix and a hub (e.g., an Ethernet hub). Preferably, two group matrix cards are employed, each containing a 2:1 optical reduction stage that "selects" working channels before the signals leave the shelf. In a 1+1 protection scheme, the two inputs to the line cards are classified as active and protect channels. The working channel is one of the active and protect channels that is selected based on bit error rate or other criteria, and so implements a redundancy scheme. This prevents the standby line cards from using any bandwidth on switching matrix 130.

Backplane

The following describes one embodiment of a backplane and some of the interface signals on that backplane. The backplane in the I/O bay shelf carries a variety of signals between line cards and other modules in the shelf. Each I/O shelf module is configured to allow an automatic, errorless switch from one power bus to the other.

Shelf processor module backplane signals include reset signals, clock signals, hardware detect signals (e.g., card detect, copy present, and the like), slot ID signals, and slot communication signals (both low and high speed). Line card backplane signals include reset signals, clock signals, communication signals, hardware detect signals, and slot ID signals. Group matrix module backplane signals include reset, clock signals, communication signals (both low and high speed), detection and hardware detect signals, and slot ID signals.

System Modules

Line Card

Figure 4:
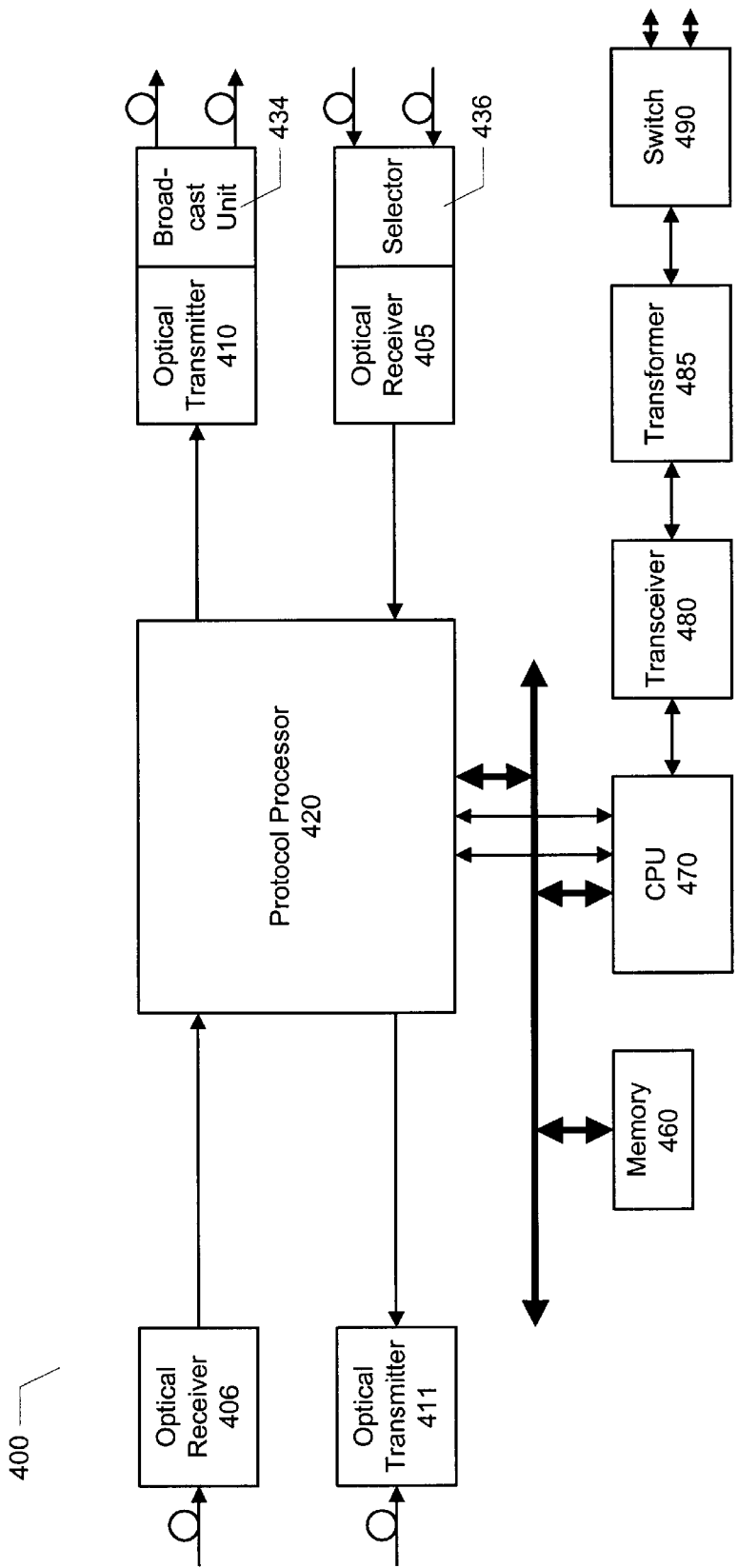
FIG. 4 illustrates the major components of one of the line cards.

FIG. 4 illustrates the major components of one of line cards 220(1,1)–(N,N), exemplified in FIG. 4 by a line card 400. A line card integrates all the necessary hardware and software functions to properly terminate the physical layer. In a SONET implementation, a line card terminates the transport overhead (Section+Line) of a full duplex OC-48 signal. Other components on this card provide a redundant optical connection to the switch matrix, and a communication channel to other modules in the system.

Line card 400 receives optical signals from other network elements via a line-side optical receiver 405 and from the local router's system via a system-side optical receiver 406. Each of these receivers implements an optical-to-electrical (O/E) conversion function. Line card 400 transmits optical signals to other network elements using a line-side optical transmitter 410 and to the group matrices using a system-side optical transmitter 411. Each of these transmitters implements an electrical-to-optical (E/O) conversion function. It will be noted that line-side refers to the side of the line card coupled to other network elements and system-side refers to the side of the line card coupled to the group matrices.

Line-side optical receiver 405 is coupled to a protocol processor 420 which performs clock recovery multiplexing, demultiplexing, and SONET STE/LTE processing in both directions. Similarly, system-side optical receiver 406 is also coupled to protocol processor 420 to allow protocol processor 420 to receive optical signals. The processed electrical signals from protocol processor 420 are coupled to the transmitters 410 and 411. The clock recovery functions are combined with demultiplexers and multiplexers to support reception and transmission of the optical data, respectively. The multiplexers serialize output data generated in protocol processor 420 by performing parallel-to-serial conversion on the parallel data. In contrast, de-multiplexers are used in protocol processor 420 to perform serial-to-parallel conversion on received data.

In order to add protection channels, line-side optical transmitter 410 is also coupled to a 1:2 broadcast unit 435. To receive such optical signals, optical receiver 406 is also coupled to a 2:1 selector 436 to select the working channel before the optical signals leave the shelf and thus prevent the standby channel (also referred to herein as the protect channel) from using any bandwidth on switching matrix 130.

Protocol processor 420 is coupled to a bus 445. Protocol processor 420 interfaces the line card to two copies of the matrix in a 1+1 physical protocol. In a SONET implementation, protocol processor 420 provides both STE/LTE processing according to published industry standards. Also coupled to bus 445 are a memory 460 and a CPU 470. Memory 460 should be fast enough for efficient operation of CPU 470.

CPU 470 communicates with other of line cards 220(1,1)–(N,N) over a control bus (not shown) using a transceiver 480 that is coupled to CPU 470. Transceiver 480, is coupled to a transformer 485 which is coupled to a switch 490. Switch 490 is coupled to the control bus. Switch 490 implements a 1:1 protection scheme for transceiver 480 and couples CPU 470 to two independent ports on the backplane (not shown). Each of the two ports connects to one copy of the hub of the group matrix. This allows the software on the line card to switch to the backup link when the line card detects failures on the active link.

Preferably, CPU 470 includes numerous integrated peripherals including embedded SCC channels (e.g. M-band communications) and an Ethernet controller (for example, to support communications with other system modules). In one embodiment, CPU 470 provides an onboard communications processor module (not shown) that handles time-critical aspects of the protocols supported.

Group Matrix Module

The group matrix module includes two independent blocks: a group matrix and a hub (also referred to herein as a repeater).

Group Matrix

Figure 5:
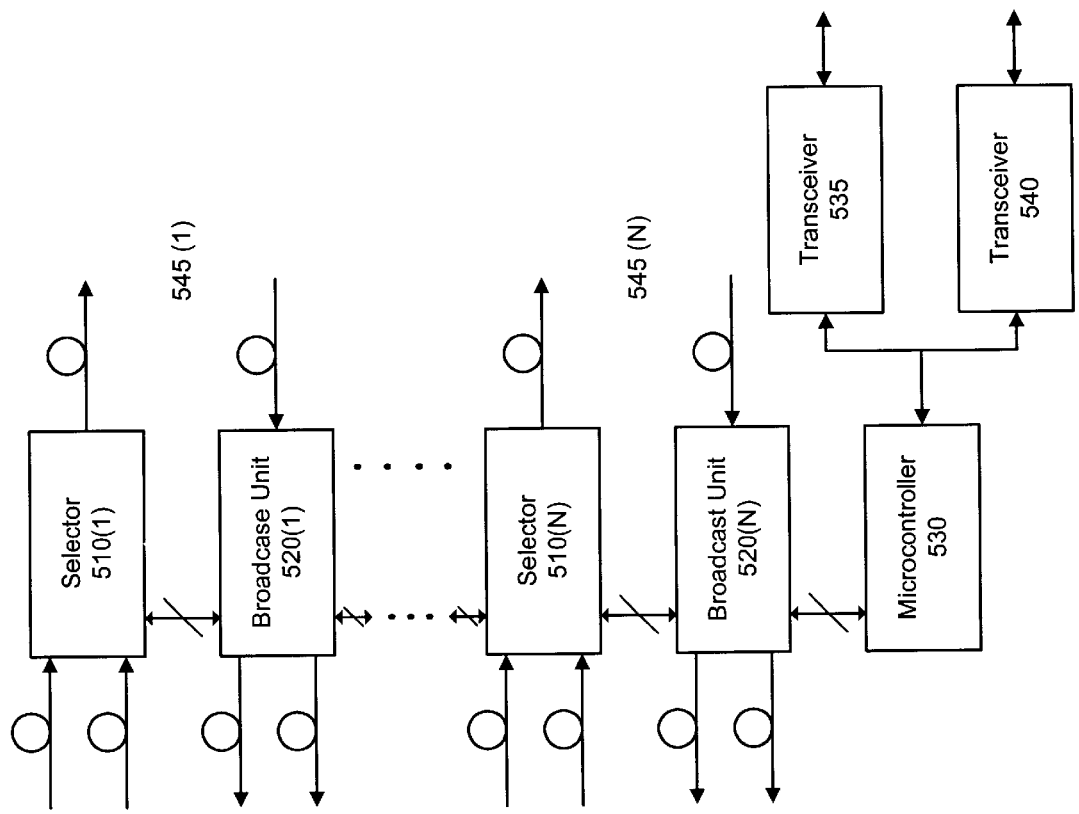
FIG. 5 illustrates an exemplary group matrix.

FIG. 5 illustrates an exemplary group matrix 500, which is exemplary of group matrices 212(1)–(N) and group matrices 216(1)–(N). In the embodiment shown in FIG. 5, group matrix 500 includes a series of 2:1 path selectors (exemplified by selectors 510(1)–(N)), broadcast units 520(1)–(N), and a microcontroller 530 controlling these. Selectors 510(1)–(N) select one of two full-duplex optical signals and couple the selected signal to switching matrix 130. Selectors 510(1)–(N), and broadcast units 520(1)–(N) are grouped into pairs to form I/O channels 545(1)–(N). Microcontroller 530 communicates with other elements of router 100 via redundant transceivers (exemplified by transceivers 535 and 540). For example, microcontroller 530 can control selectors 510(1)–(N) and broadcast units 520(1)–(N) through commands received from the group processor.

Hub

One or more hubs are also provided to support communication between the group matrices and system switches in router 100. In an Ethernet communications environment, the hub's functions are carried out primarily by repeater interface controllers (RICs). Each RIC integrates the functions of a repeater, clock and data recovery unit (CDR), Manchester encoder/decoder, and transceiver. Each RIC has a set of registers that convey status information and allow a number of configuration options to be specified by the user using, for example, a microcontroller.

Shelf Processor Module

The shelf processor module provides, among other elements, a shelf processor and switch that interconnect the LAN segments from the groups and the shelf processor to a port on the shelf switch (Ethernet switch 630).

Shelf Processor

Figure 6:
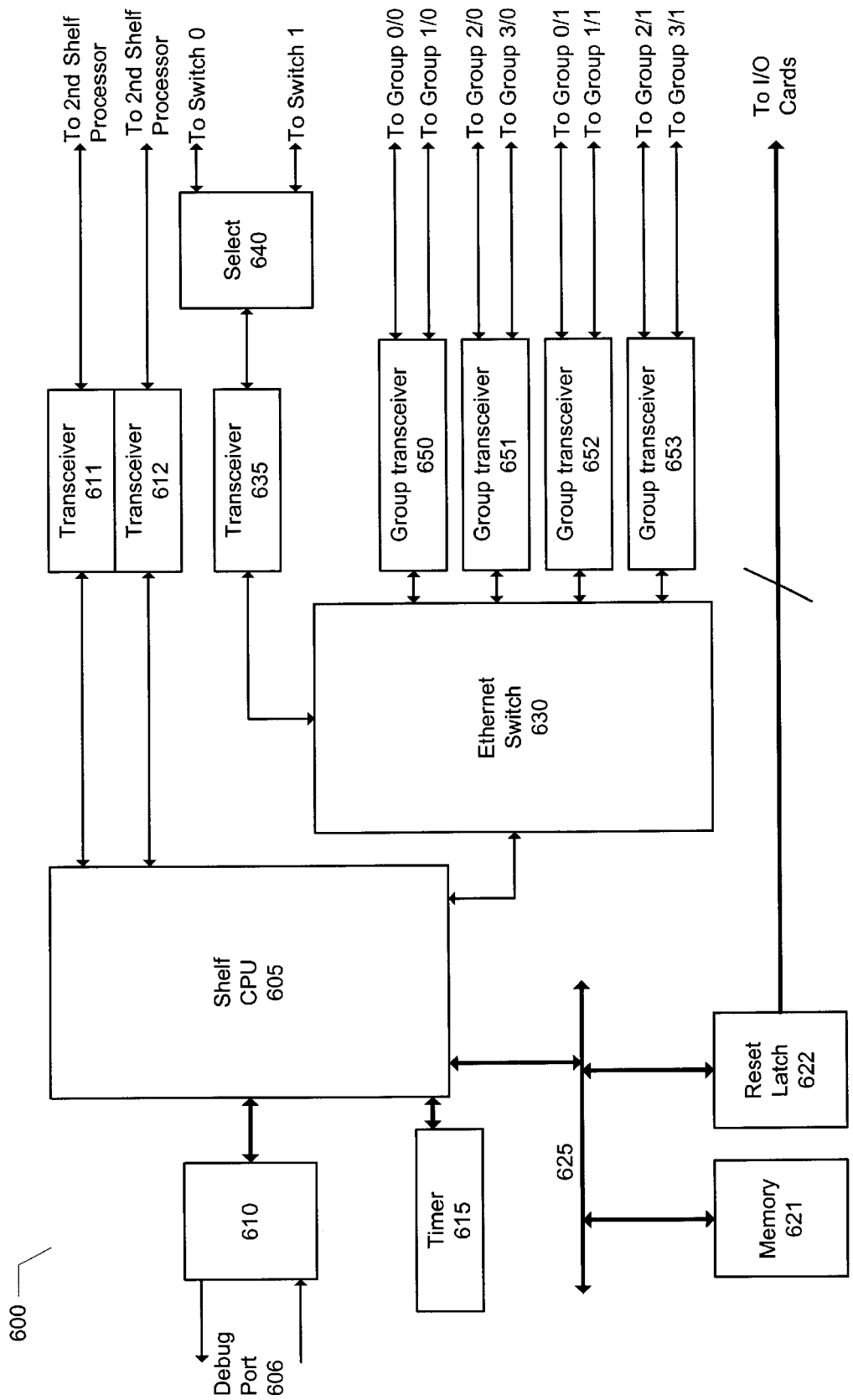
FIG. 6 illustrates a shelf processor which is responsible for the overall operation, management and control of a shelf.

FIG. 6 illustrates a shelf processor 600 which is responsible for the overall operation, management, and control of the shelf. A shelf CPU 605 controls the functions of shelf processor 600. Shelf CPU 605 is connected to a debug port 607 via a debug port transceiver 610. Debug port 607 may be a device capable of coupling shelf CPU 605 to a personal computer or dumb terminal. Debug port 607 allows a user to access shelf processor module 600 to determine the cause of any errors therein. Transceivers 611 and 612 each connect an SCC channel of shelf CPU 605 to the other shelf processor. The resulting link, which can use high-speed asynchronous framing, serves as an inter-processor communications interface.

Shelf CPU 605 is also connected to a timer 615, which preferably contains at least three functional blocks, a power-fail-reset block, an external reset block, and a timer block. Shelf CPU 605 also accesses a memory 621 and a reset latch 622 over a CPU bus 625. Reset latch 622 supports reset of one or more cards (not shown). Shelf CPU 605 is also coupled to an Ethernet switch 630. The network switch interconnects the lower speed inter-processor communication network segments in each shelf. In one embodiment, the network switch provides support for 10 Mbps and 100 Mbps segments. In one embodiment, an integrated bus master and slave interface allow multiple devices to be interconnected.

Ethernet switch 630 is coupled to a transceiver 635 which, via a select 640, allows Ethernet switch 630 to connect to two separate Ethernet segments. Select 640 implements a 1:1 protection scheme that allows shelf processor 600 to recover from failures on the active segment by simply switching to the other segment. Ethernet switch 630 is also coupled to one or more group transceivers (exemplified by group transceivers 650, 651, 652, and 653). Group transceivers 650, 651, 652, and 653 connect ports on Ethernet switch 630 to the groups.

System Switch

One embodiment of a system capable of interconnecting network segments in a switched configuration allows communications between shelf switches, higher-level (e.g., level-1) processors, and shelf-processors. In an Ethernet-based system, the system switch supports both 10 Mbps and 100 Mbps connections. The segments come from the shelf switching in the I/O shelf and the matrix switches, among others, and allow these elements to communicate.

Main Matrix Bay

Switching in router 100 is based on a rearrangeably non-blocking network. A switching matrix, as described herein consists of switch nodes arranged in a staged array. For a 256×256 switching matrix, for example, switching matrix 130 consists of 48 nodes arranged in an array of 16 rows by 3 columns, with each column containing one stage of the switch matrix. All 48 nodes in the switch matrix are substantially similar and consist of a 16×16 crossbar device that allows any of its 16 inputs to be connected to any of its 16 outputs, regardless of the current state of the crossbar.

Main Matrix

Figure 7:
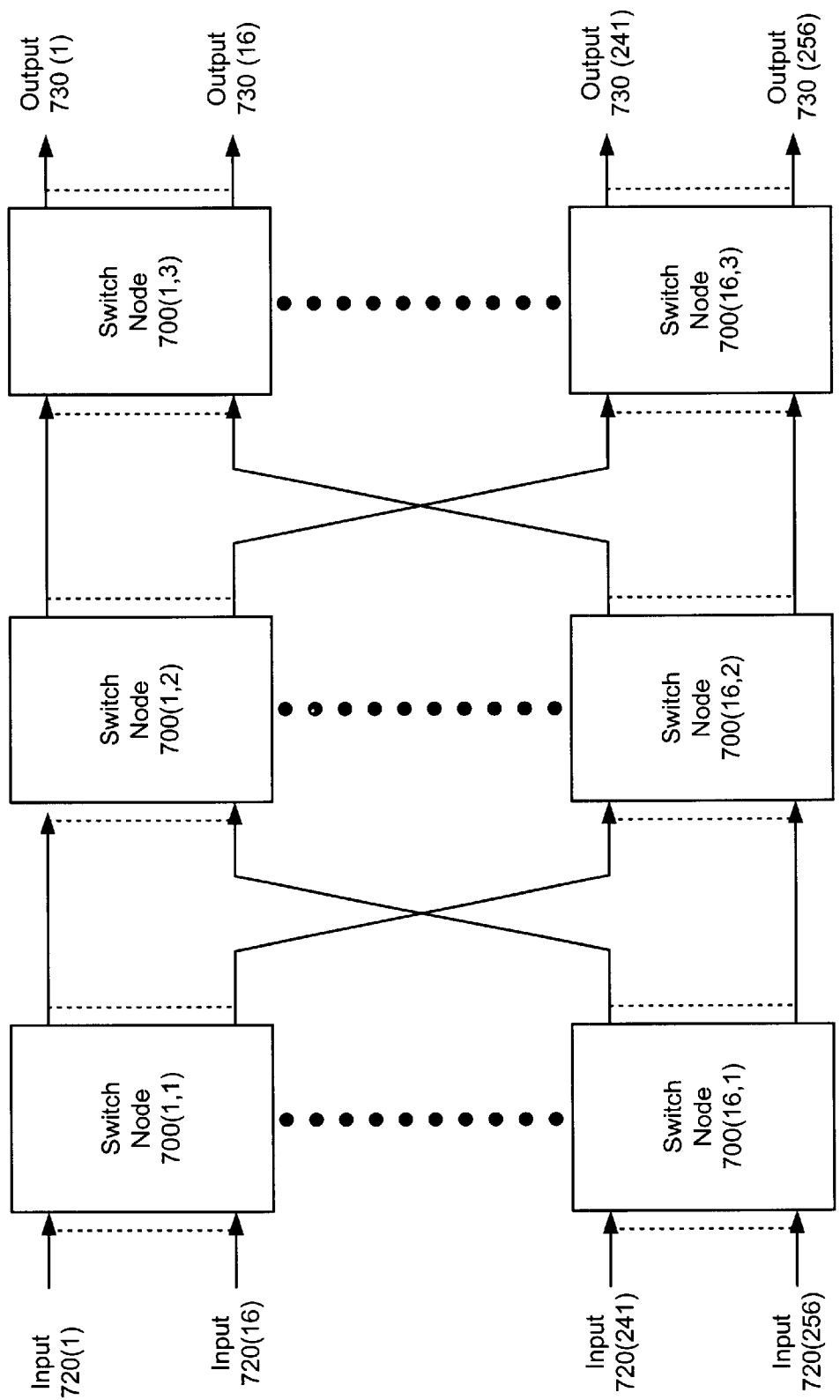
FIG. 7 illustrates the structure of a multistage matrix.

FIG. 7 illustrates switching matrix 130 configured in the manner of the switch matrix just described. In one embodiment, switching matrix 130 employs a 256×256 matrix, an array of switching nodes 700(1,1)–(16,3), each of which is a 16×16 crossbar switch that allows any of the 16 input signals to be connected to any of its 16 outputs, regardless of the current state of the crossbar. In one environment, each of the interconnections between switching nodes 700(1,1)–(16,3) represent dual gigabit interconnections. As noted, the embodiment illustrated in FIG. 8 supports the switching of up to 256 inputs, shown as inputs 720(1)–(256). Inputs 720(1)–(256) are switched to one of outputs 730(1)–(256). Physically, each of the 48 switching nodes of this embodiment occupies a single slot in the matrix rack. The rack itself is made up of three shelves (one per matrix column) that house the switch node cards (there are 16 such cards in every shelf) and six-shelf-processor cards (two per shelf).

Matrix Rack

A rack is used to hold one or more matrices, and is referred to herein as a matrix rack. In one embodiment, a matrix rack is configured to hold 48 switching nodes (e.g., switching nodes 700(1,1)–(16,3)) in a compact physical configuration. The matrix rack thus can support, for example, switching nodes 700(1,1)–(16,3), which each provide 16 input signals and 16 output signals, and thus provides switching matrix 130 with 256 input signals and 256 output signals. Matrix shelf processors are configured in redundant pairs to provide fault-tolerant control of switch nodes 700(1,1)–(16,3).

The cross-connect information, i.e. input-to-output mapping, is written into the crosspoint switch by a local microcontroller which receives the information from the local shelf processor over a high-speed connection. The three shelf processors in each rack receive such information from the node controller, which resides in a different rack. This hierarchy can be extended indefinitely. The crosspoint switch receives a high speed serial data from the optical receivers that perform optical-to-electrical conversion on the received optical signals. Data from the crosspoint switch is retimed to synchronize the data with the system clock of router 100, using a clock and data recovery (CDR) unit, before being converted back into an optical signal that connects to the next stage of the matrix over fiber-optic cables.

Switch Node Module

Figure 8:
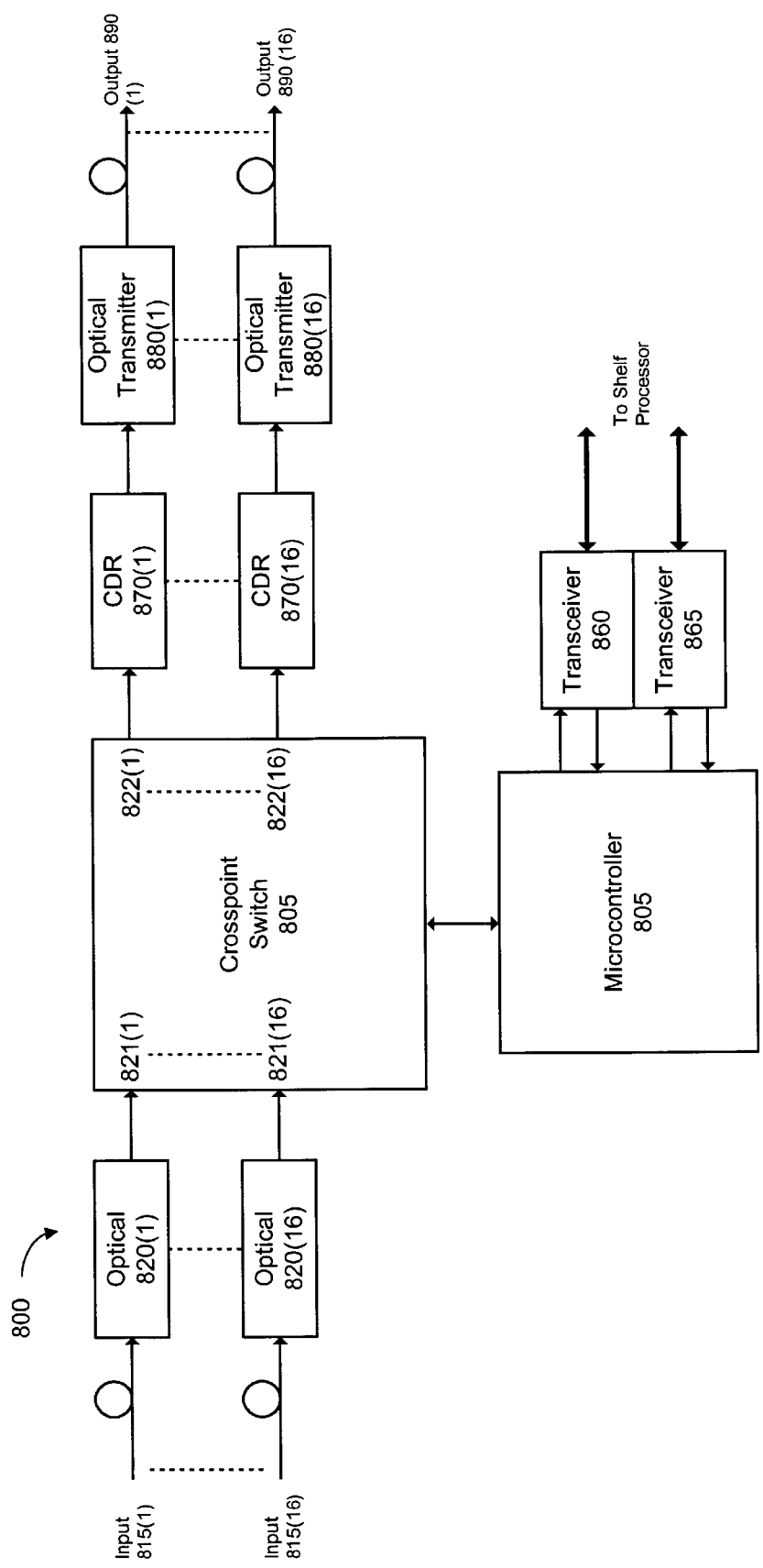
FIG. 8 illustrates one of the switching nodes.

FIG. 8 illustrates one of switching nodes 700(1,1)–(16,3) as a switching node 800. Switching node 800, in one embodiment, is a complete, strictly non-blocking, 16×16 OC-48 multi-stage crossbar matrix which allows any of its inputs to be connected to any of its outputs regardless of the current state of the matrix. A crosspoint switch 810 is controlled by a local microcontroller (a microcontroller 840) that also manages the optical transceivers, CDRs, and onboard SONET device. Configuration for switch node 800 is downloaded from microcontroller 840 over a low-speed bus.

The block diagram of switch node 800 in FIG. 8 illustrates the main elements of a switch node using a SONET-based implementation. The core of the switch node 800 is crosspoint switch 810, which is a 16×16 crossbar switch when implementing a 256×256 matrix. Crosspoint switch 810 is preferably a 2.5 Gbps 16×16 differential crosspoint switch with full broadcast capability. Any of its input signals can be connected to any, or all, of its output signals. The device is configured through a low-speed port that, through a two-step/two-stage process, allows changes to be made to switch configuration without disturbing its operation.

Assuming 16 input signals (indicated in FIG. 8 as inputs 815(1)–(16)), crosspoint switch 810 is configured to receive optical input signals from optical receivers 820(1)–(16) at switch input signals 821(1)–(16). Crosspoint switch 810 also provides switch outputs 822(1)–(16), which serve as the source of optical output signals for switch node 800. Microcontroller 840 is also responsible for detecting and reporting loss-of-signal (LOS) and out-of-lock (OOL) conditions from the optical receivers and CDRs, respectively. Microcontroller 840 communicates with the shelf processor via transceivers 860 and 865 over a bus that carries asynchronous data over a backplane (not shown).

Incoming signals are routed to one of switch outputs 822(1)–(16) by crosspoint switch 810 under the control of microcontroller 840. Switch outputs 822(1)–(16) are coupled to CDRs 870(1)–(16), which in turn drive optical transmitters 880(1)–(16). Output signals from optical transmitters 880(1)–(16) appear at outputs 890(1)–(16) as optical signals.

Matrix Shelf Processor Module

Matrix shelf processor 900 module provides local control and management for one of the main-matrix shelves. The matrix shelf processor 900 communicates with the level-1 and route processors over a low speed network connection and with the matrix node cards over a multi-drop, low-speed bus.

Figure 9:
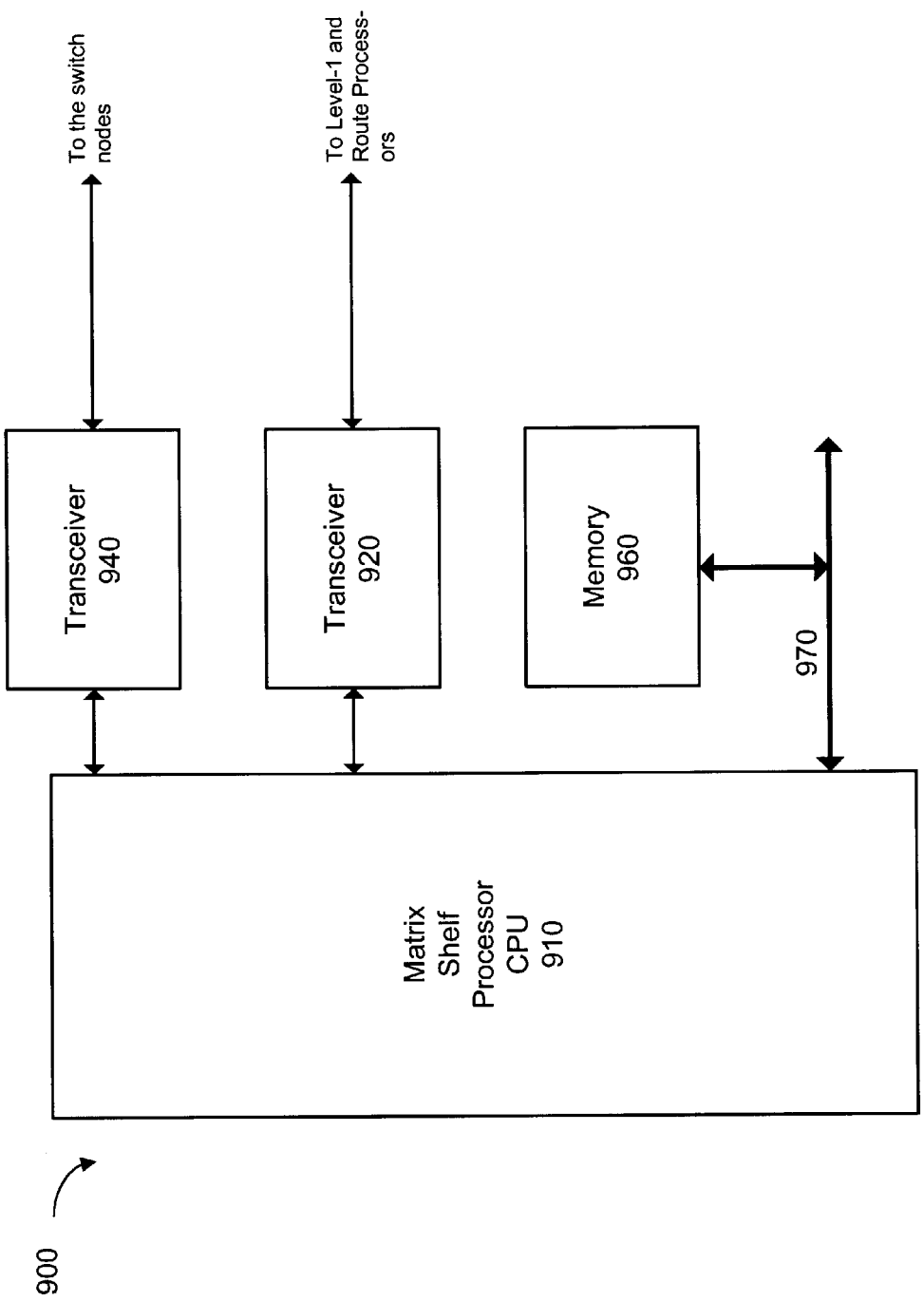
FIG. 9 illustrates a matrix shelf processor.

FIG. 9 illustrates a matrix shelf processor 900, which is illustrative of a matrix shelf processors and shelf processor 600 of FIG. 6. Matrix shelf processor 900 provides local control and management for one of the shelves of a main matrix such as switching matrix 130 (FIG. 1). The core of matrix shelf processor 900 is a matrix shelf processor CPU 910. Matrix shelf processor CPU 910 communicates with one or more level-1 processors (not shown) and route processors (not shown) via a transceiver 920 (preferably a 10BASE-T transceiver). Matrix shelf processor CPU 910 communicates with the system switches (i.e., system switches 340 and 341) via a transceiver 940. To support these functions, matrix shelf processor CPU 910 is coupled via a processor bus 970 to memory 960 which provides storage for various software modules run by matrix shelf processor CPU 910.

Management Bay

The management bay can house, for example, the following modules:
1. Level-1 processors, or system controllers, and their associated storage devices;
2. Route processors;
3. Optional group and WAN cards;
4. System Ethernet switches; and
5. Synchronization modules.

All of the above modules are fully redundant and communicate with the rest of router 100 over redundant control buses. The placement of individual modules within the rack is not addressed in this document, since there are no architectural preferences, or restrictions, on such choices.

Level-1 Processor/System Controller

Figure 10:
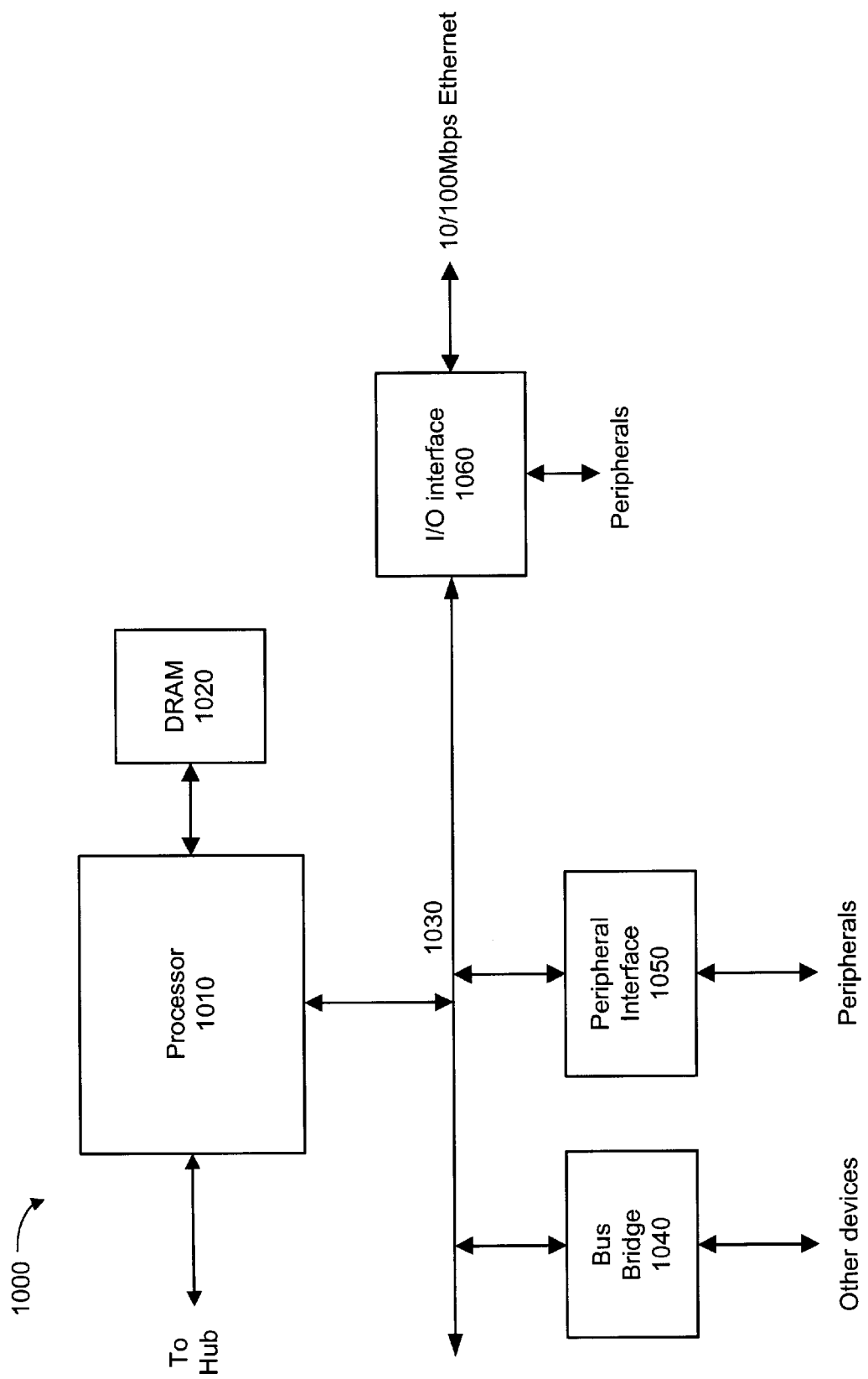
FIG. 10 illustrates a system controller.

FIG. 10 illustrates a system controller 1000 (also referred to herein as a level-1 processor). The core of the system controller 1000 is a processor 1010, which also communicates with the system switches (i.e. system switches 340 and 341). Programs run on processor 1010 are stored in memory 1020 coupled thereto. Processor 1010 is also coupled to an all-purpose bus (APB) 1030, which in turn drives several bus and communications controllers. Among the controllers interfaced to APB 1030 is a bus bridge 1040, a peripheral interface 1050, and an I/O interface 1060. I/O interface 1060 may provide functionality such as 10 Mbps/100 Mbps Ethernet communications. I/O interface 1060 also supports peripherals such as keyboards, mice, floppy drives, parallel ports, serial ports, and the like. Bus bridge 1040 allows communications between processor 1010 and other devices. Peripheral interface 1050 allows communications with peripherals such as hard disks. The level 1 processor performs various functions, such as communicating with the route processor(s) to determine how the matrix should be configured, managing the router's resources, and similar duties.

APB 1030 may also be connected to a dual-channel serial communication controller (SCC), which is used to communicate with one or more remote Operations Systems (OS) using, for example, the X.25 protocol. For more OS links and higher link speeds, the user can optionally install one or more WAN Interface Modules in the management bay. Such modules, which preferably handle all real-time aspects of the OS link, including layer-2 of the OSI stack, communicate with the level-1 processor.

Route Processor Module

Figure 11:
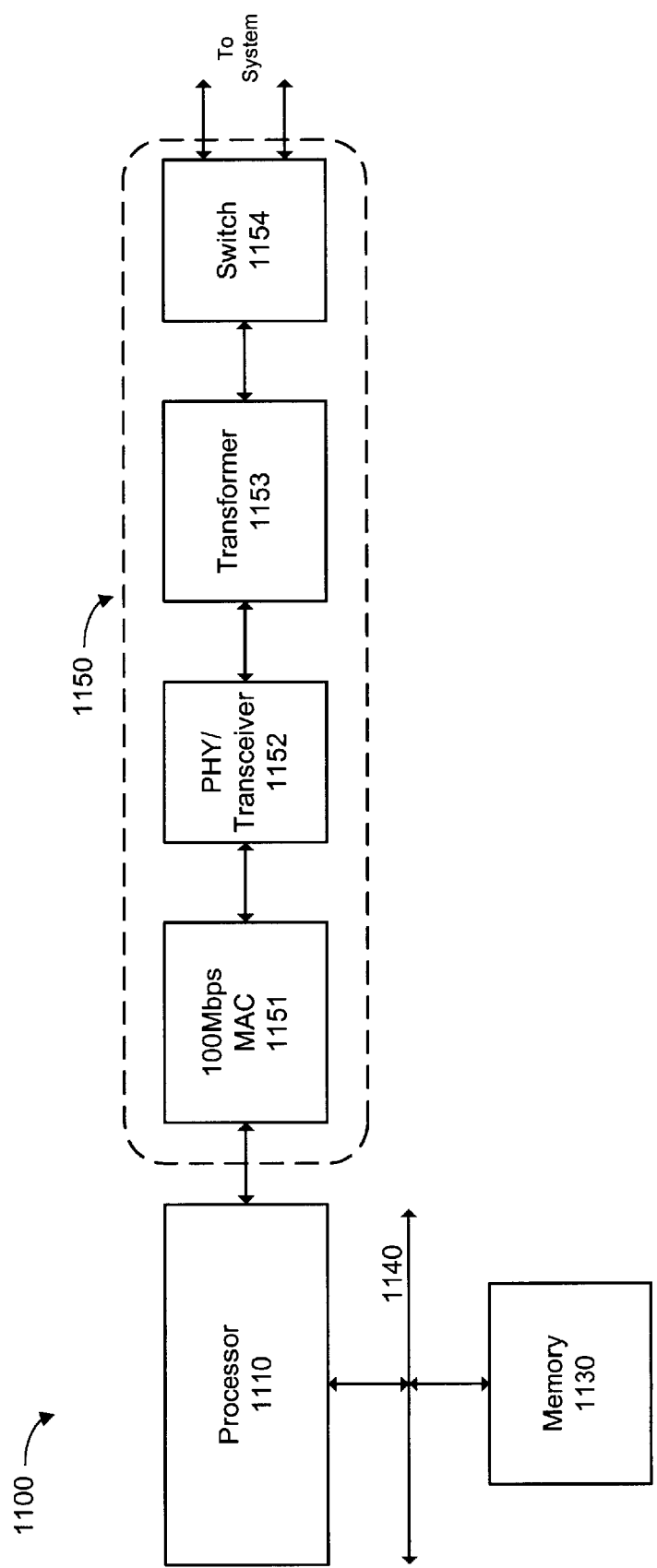
FIG. 11 illustrates a route processor.

FIG. 11 illustrates a route processor 1100. Route processor 1100 is a high-speed processor subsystem with relatively limited I/O capabilities. Route processor 1100 functions to receive link-failure indications from the line cards (not shown), computes an alternate route for failed connections using a restoration protocol such as that described in the co-pending application entitled "A METHOD FOR ROUTING INFORMATION OVER A NETWORK" and previously included by reference herein, and then sends one or more configuration requests to all affected nodes to achieve this new routing. Route processor 1100 is able to communicate directly with all system modules, including the line cards (not shown) and the matrix shelf processors (not shown) via a redundant high speed network connection to the system switch. In systems using Ethernet as the communication mechanism, route processor 1100 communicates with these elements via a redundant 100 Mbps connection to the system Ethernet switch. The core of route processor 1100 is a processor 1110 which runs software stored in memory 1130 via a CPU bus 1140. As noted, the software implements a routing protocol such as that mentioned above. Processor 1110 communicates with other systems of router 100 using an Ethernet communications mechanism via a 100 Mbps Ethernet transceiver 1150. Ethernet transceiver 1150 is depicted in FIG. 10 as including a 100 Mbps MAC 1151, a PHY/transceiver 1152, a transformer 1153 and a switch 1154. Switch 1154 provides a redundant connection to the other systems of router 100 to allow uninterrupted operation in the event of a communications failure.

System Switch

Figure 12:
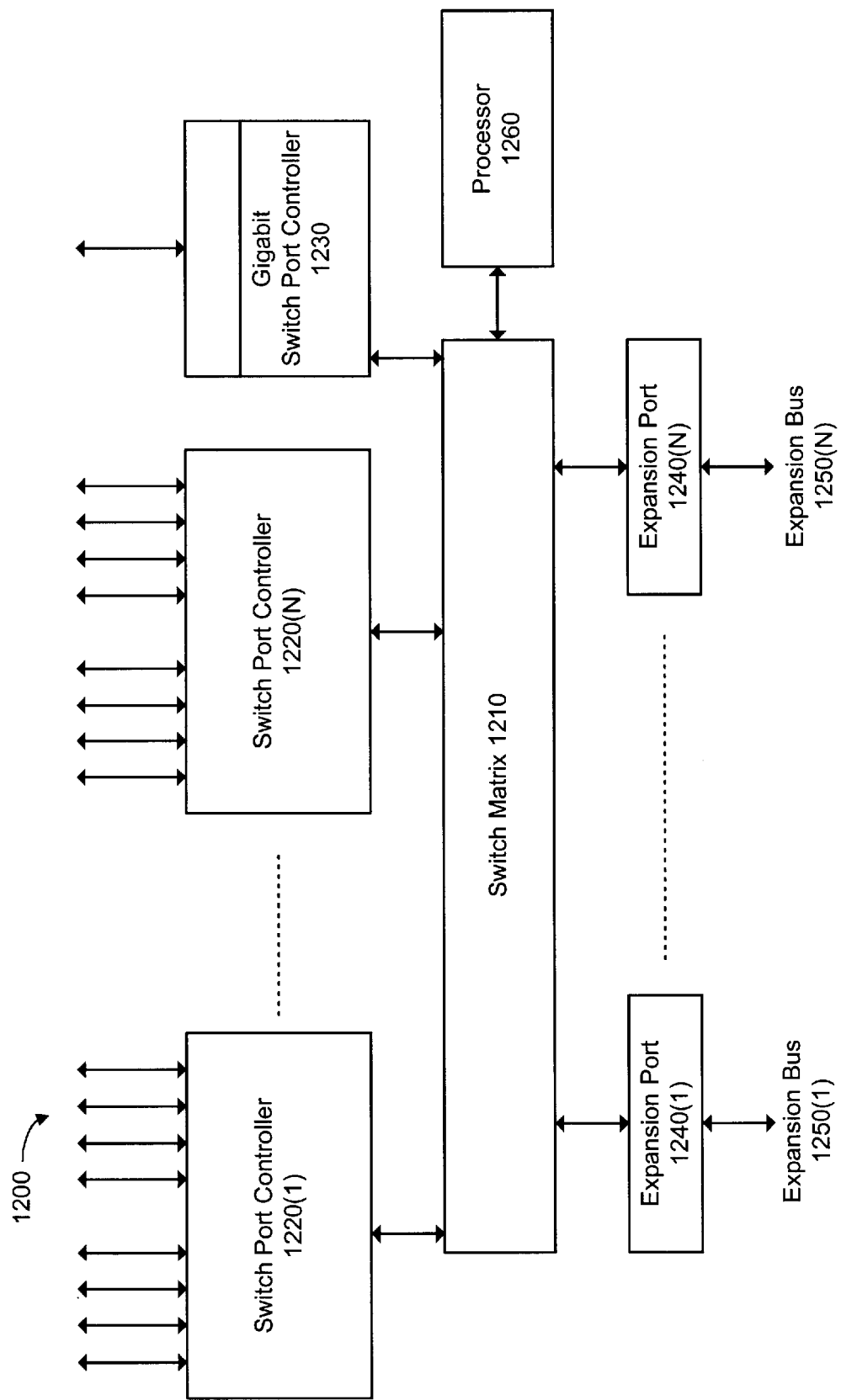
FIG. 12 illustrates an example of a system switch.

FIG. 12 illustrates an example of a system switch depicted as a system switch 1200, which can use an Ethernet-based communications, for example. In an Ethernet configuration, system switch 1200 manages the Ethernet connections from all level-1, level-2, route, and optional Wide Area Network (WAN) processors (not shown). System switch 1200 implements a high-speed, low-latency Ethernet switch that isolates local traffic to individual segments. The core of system switch 1200 is a switch matrix 1210. In one embodiment, switch matrix 1210 is an eight port bus that interconnects switch port controllers 1220(1)–(N), one or more high-speed interfaces (exemplified by a gigabit Ethernet switch port controller 1230), and expansion ports 1240(1)–(N). Each one of expansion ports 1240(1)–(N) communicates with a corresponding one of expansion buses 1250(1)–(N), respectively. Switch matrix 1210 is controlled by a processor 1260. Each copy of system Ethernet switch 1200 thus supports communications with level-1 processors, route processors, each I/O bay, and each matrix shelf processor. In Ethernet-based systems, these connections may be by 100 Mbps or 10 Mbps connections.

Software Architecture

In one embodiment, router 100 implements many functions in software to provide flexibility, support for communications protocols, and ease of implementation. The software architecture presented here forms a distributed management, control, and routing layer capable of spanning hundreds or thousands of nodes. The software architecture covers all protocol layers, management and control applications, and inter-node communication protocols and APIs.

The software modules described herein may be received by the various hardware modules of router 100, for example, from one or more computer readable media. The computer readable media may be permanently, removably or remotely coupled to the given hardware module. The computer readable media may non-exclusively include, for example, any number of the following: magnetic storage media including disk and tape storage media; optical storage media such as compact disk media (e.g., CD-ROM, CD-R, etc.) and digital video disk storage media; nonvolatile memory storage memory including semiconductor-based memory units such as FLASH memory, EEPROM, EPROM, ROM or application specific integrated circuits; volatile storage media including registers, buffers or caches, main memory, RAM, etc.; and data transmission media including computer network, point-to-point telecommunication, and carrier wave transmission media. In a UNIX-based embodiment, the software modules may be embodied in a file which may be a device, a terminal, a local or remote file, a socket, a network connection, a signal, or other expedient of communication or state change. Other new and various types of computer-readable media may be used to store and/or transmit the software modules discussed herein.

Overall Architecture

The software running the various processors of router 100 normally includes three major components: operating system, inter-processor and inter-node communications, and management and control applications. The operating system should provide standard facilities for supporting program operation, communications, and system management tasks.

An important aspect of any software architecture is its underlying inter-process communications (IPC) mechanism. IPCs that provide for the isolation of tasks are preferable. Such IPCs use message passing as their preferred communication. Message passing allows for full, but isolated interaction among tasks. To the rest of the system, a task, no matter how complex, is reduced to a simple producer and consumer of messages. The system provides a set of well defined services, each accessed through one or more messages. Though sometimes visible to other tasks, in one embodiment, none of a given task's variables and structures should be accessible outside its context. Limiting task interactions to message passing and keeping runtime variables private to each task allows individual software components to evolve independently and in parallel.

In order to keep code generic (i.e., system-and processor-independent), the message-based IPC should also provide a consistent application programming interface (API) that doesn't rely on any system-specific features or attributes. The API should have the same syntax and behavior, regardless of the underlying operating system, processor, or message-passing mechanism used. With certain generating systems, for example, message queues are used to implement the IPC, while on other kernels, pipes might be more appropriate. Preferably, then, the API should provide the following services to the application code:
1. Send message;
2. Receive a message;
3. Check for available messages; and
4. Name lookup and registration.

The last service, name lookup and registration, makes it possible for communicating entities to reference one another using names rather than task ID's, which are system-dependent.

Resource Manager

A resource manager (RM) is the software module responsible for collecting information about available resources and monitoring their status during normal system operation. A resource is used generically in this document to refer to any manageable hardware element that performs one or more system functions. The RM builds its resource list from unsolicited information the RM receives from other modules in the system, and from periodic keep-alive messages the RM exchanges with those modules. The RM, for example, is the first system application notified of card failures, insertions, and removals.

In one embodiment of router 100, there are two RM versions in the system. The first, which runs on the level-1 processor, is responsible for managing system resources and, in some cases, network-wide resources. The other version, which runs on level-2 processors, is responsible for managing resources in a single shelf. This multi-level hierarchy creates a flexible and expandable system where lower-level resource managers are custom designed for the specific shelf controlled.

The RM maintains information about a given resource in a structure called the Resource Control Block (RCB). The RCB consists of two main sections: a generic section, which is the same for all resources regardless of type, and a resource-specific section that varies according to resource type. All resource managers maintain a hierarchical list of resource control blocks that represents resources under their control. The list is referred to herein as the resource list and reflects the resources' hierarchy and their interdependencies. This allows the RM to determine, relatively quickly, the effect a given resource's failure has on other members of the hierarchy.

The router 100 preferably runs one or more versions of the Unix operating system on the level-1 processor and the level-2 processors (in the I/O and matrix shelves). Level-2 processors preferably run a real-time version of the Unix operating system (OS). Other processors (e.g., level-3, route, quad, and matrix-node processors) preferably run a single task that does not require the services of an operating system or kernel. While Unix operating systems are described herein as being preferable, any one or a number of operating systems may be used.

System Controller

The system controller is responsible for overall system management and control. The system controller uses a variety of protocols to communicate with other nodes in the network, including the operating system (OS). Some of the protocols satisfy specific requirements (e.g. in a SONET based system, the transfer of OAM&P message across the SONET/SDH communications channels DCC), while others implement features, or functions, that are not part of the physical protocol used. To facilitate these functions, every router (one router, two, etc.) in a network is assigned an ID that uniquely identifies the router within the network. The ID can also serve as a priority metric that determines the node's level within the hierarchy. However, the network can be configured to allow the user to override this by manually assigning priorities to network nodes. The system controller supports a number of tasks that perform management, control, and routing functions, including resource management, OS interfacing, various network protocol servers, and operations, control, and intermediate system services.

Matrix Shelf Processor

The matrix shelf processor is responsible for the overall operation of a single main matrix shelf. The matrix shelf processor communicates with the system controller, the route processor, and the microcontroller on each of the switch nodes, to provide local control and management for the shelf, including matrix configuration, diagnostics, and error reporting. The software on the matrix shelf processor preferably runs under a real-time Unix operating system. The RM on the matrix shelf processor is responsible for managing the hardware resources in its shelf. Like other resource managers in the system, the level-2 manager on this module uses a combination of hardware and software to discover and maintain a list of available shelf resources. A protocol may be implemented to support such messaging.

I/O Shelf Processor

Line Card

The I/O Module terminates an input signal from one of the other nodes in the network. For example, in a SONET-based implementation, a single SONET/SDH OC-48 signal is terminated by an I/O module, although other signal levels (OC-192, OC-12, and so on) may be supported. In one embodiment, the software consists of two threads, one that runs in the background and is responsible for non-time critical tasks. The other thread, which runs at the interrupt level, is responsible for all real-time aspects of the software, including limited overhead processing, alarm detection and forwarding, and fault detection and recovery. The I/O module maintains a copy of its firmware and startup code onboard.

II. The Provisioning of Network Services

When used in an optical networking context, for example, a router such as router 100 can support the provisioning of network services on a highly customizable basis. This ability opens a new avenue in the provision of information delivery services to Internet backbone providers, inter-exchange carriers (IXCs), Internet service providers (ISPs), long distance carriers, private line customers, and other such users.

A router (and so network), in order to support a method according to the present invention, preferably supports virtual circuits with various quality of service (QoS) levels, and permits those virtual circuits to be quickly provisioned and deprovisioned, as necessary. A virtual circuit's QoS level may be defined, for example, as a set of separately definable parameters or as one of a set of possible combinations of those parameters. Using separately-defined parameters, a user defines a virtual circuit's requested QoS using service parameters such as provisioning time, latency time, availability, restoration time, bandwidth, distance, duration of the virtual circuit, and other such parameters. These parameters may be tailored to the needs (and budget) of the user by having the user specify the parameters' values separately. Alternatively, the user may select one of a number of predefined levels.

Using one of these approaches, selections of QoS parameters/levels can be priced accordingly. For example, pricing for these services can be established on a QoS level basis, using the combination of demand during availability, requested bandwidth, latency, provisioning/restoration time, and the like to arrive at an appropriate price. For example, by provisioning virtual circuits for specified durations, a service provider is given the flexibility to adapt to the changing demands placed on its transmission infrastructure by the requirements of services such as virtual private networks, Internet telephony, large numbers of voice channels, increasing numbers of Internet users, and the like. Such a service would likely vary the available bandwidth with the time of day, and have a moderate cost structure. Alternatively, virtual circuits can be quickly provisioned to address unforeseen peaks in demand, and then terminated when the excess capacity is no longer required, for example. Such "emergency service" would likely be expensive, given the immediate need.

Figure 13:
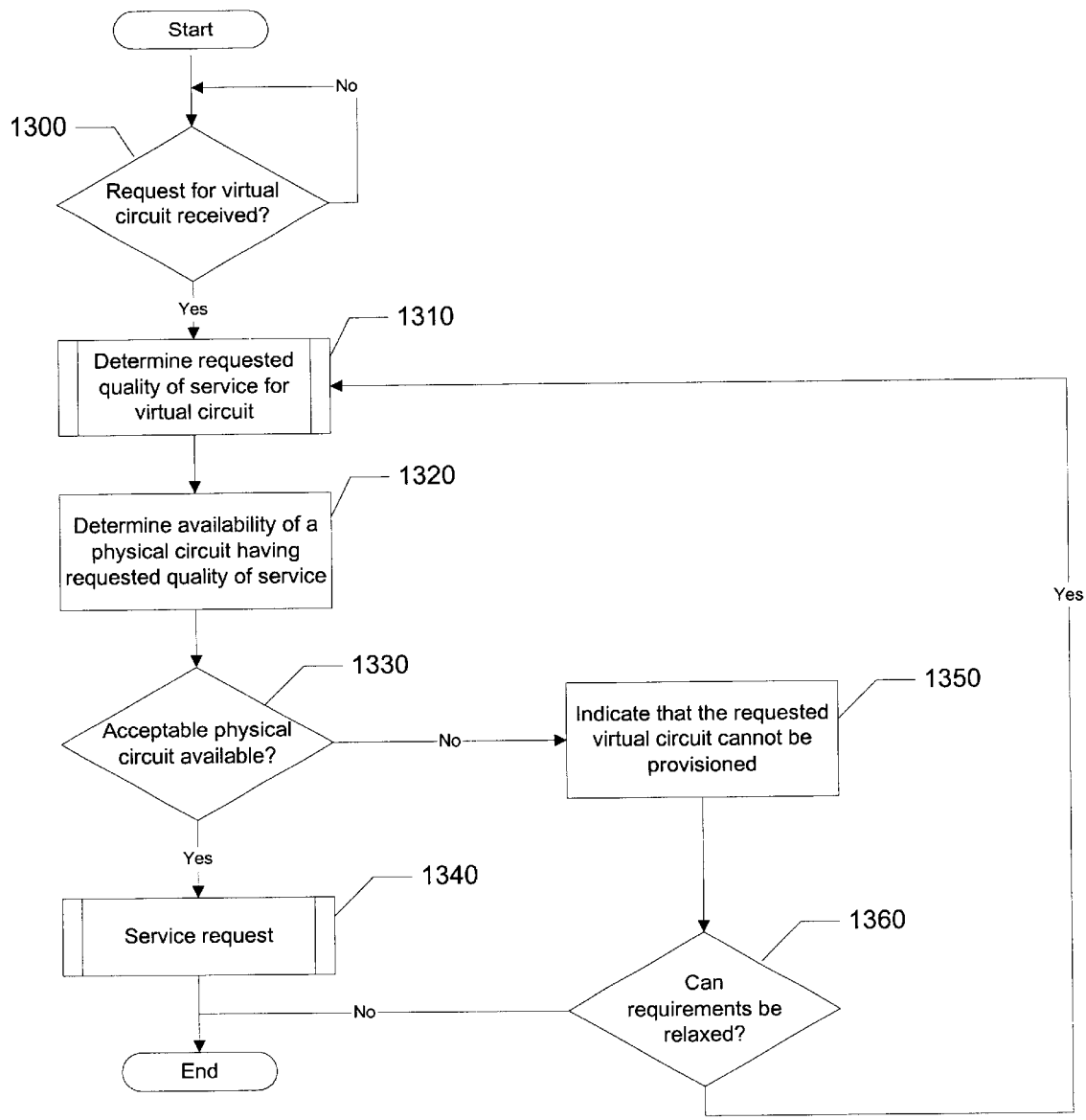
FIG. 13 illustrates an example of a method of provisioning a virtual circuit based on end-user requests.

FIG. 13 is a flow diagram illustrating the steps taken by a service provider in providing services based on a requested QoS level. The provision of services begin with the service provider receiving a request for a virtual circuit from a user (e.g., a carrier, inter-exchange carrier, ISP, or other such entity) (step 1300). The service provider then analyzes the user's requirements to determine the QoS desired (step 1310). Examples of the various QoS parameters that may be selected by a user are discussed subsequently in regard to FIG. 14. Next, the service provider determines the availability of a physical circuit having the requested QoS (step 1320). This can be accomplished using, for example, a protocol such as that described in the copending patent application entitled "A METHOD FOR ROUTING INFORMATION OVER A NETWORK" (as previously referenced). Such a method preferably examines the current state of the network, with regard to the selected QoS parameters/levels, and determines the availability of one or more physical circuits. Preferably, the method should do so using one or more heuristics, such- as using per-link criteria (e.g., link bandwidth) to "pre-screen" for acceptable links by eliminating unacceptable links (e.g., links having too little bandwidth). If a physical circuit meeting the requested criteria is available (step 1330), the request is serviced (step 1340). The servicing of the request is the subject of FIG. 14, which is described subsequently, and nominally consists of provisioning the virtual circuit at the requested provisioning time, maintaining the virtual circuit, and, should the need arise, restoring the virtual circuit. The end-user may begin using the virtual circuit once provisioning is completed.

If an acceptable physical circuit cannot be provisioned at the time of the request (step 1330), the service provider indicates to the user requesting service that a virtual circuit having the requested QoS parameters/level cannot be provisioned, and then indicates to the user that the requested virtual circuit cannot be provided at the requested QoS level (or cannot be provided with the requested QoS parameters) (step 1350). The user must determine if the requested QoS requirements can be relaxed (e.g., provision later, reduced availability or bandwidth, source or destination changed, or the like) (step 1360). If so, the process begins anew with the new requirements (step 1310). Otherwise, the requested virtual circuit cannot be provisioned.

Figure 14:
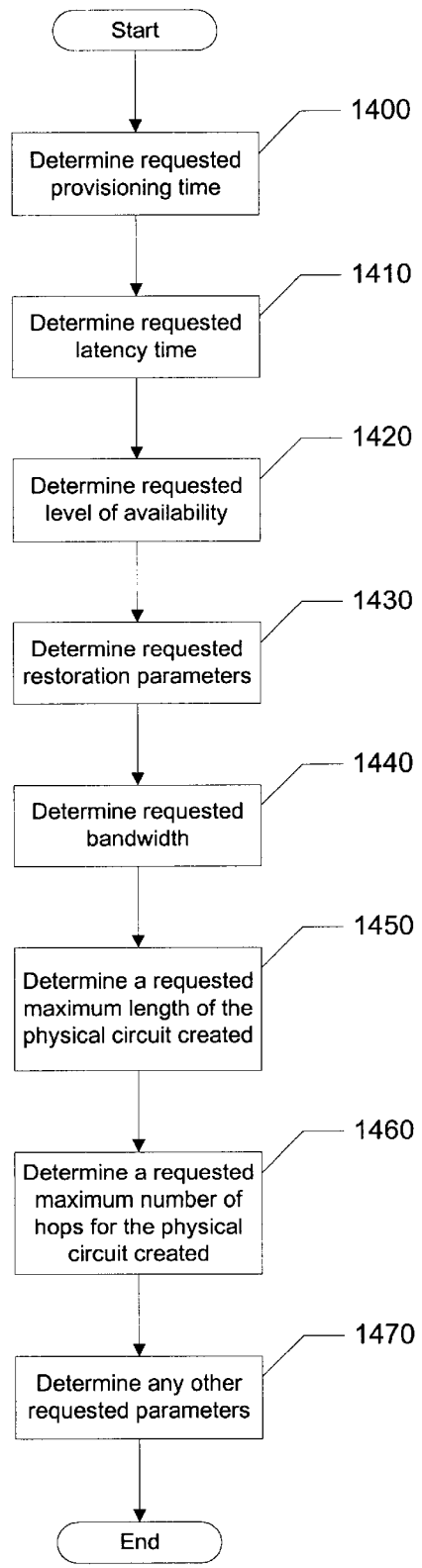
FIG. 14 illustrates an example of a method of determining quality-of-service parameters of an end-user request.

FIG. 14 illustrates the process used in determining certain of the possible QoS parameters which may be used in defining the level of service desired for a requested virtual circuit. A virtual circuit's QoS is defined by a set of parameters that is referred to herein as a service type. A service type can include a provisioning time (within which the virtual circuit is to be provisioned), a latency time (within which information is to be communicated between two nodes of the network), a level of availability, and various restoration parameters, for example. A service type can also include a requested bandwidth, a requested maximum length, and a requested maximum number of hops, among other possible parameters.

Examples of latency values include least possible (including deprovisioning one or more virtual circuits), minimum available (no deprovisioning), and maximum. The availability parameter can include, for example, an up-time parameter (e.g., with values of guaranteed availability and best-efforts availability) and a scheduling parameter. The scheduling parameter specifies at least one period of time per day during which the virtual circuit is available for use and includes availability of at least one period of time per day, commencing at a specified time of day, during one or more specified days-of-the-week, or some other scheduling scheme (e.g., a schedule of times, days, and/or dates of availability).

Restoration parameters may include, for example, one or more of the following: a restoration time, a restored latency time, and a restoration priority. The restoration time is the period of time within which the virtual circuit is to be restored in response to a failure in the network affecting the virtual circuit. The restored latency time is the latency time exhibited by the newly-restored virtual circuit. The restored latency time can assume a number of values, including a least possible restored latency time, a minimum available restored latency time, and a best-effort restored latency time. The least possible restored latency time is the lowest latency time that the network is configured to provide, and may necessitate the deprovisioning of one or more virtual circuits. The minimum available restored latency time is the lowest latency time that the network can provide without deprovisioning any of the virtual circuits. The best-effort restored latency time is simply guaranteed to be less than some maximum value. The restoration time can assume one of a number of values, including about 50 ms, about 250 ms, and a maximum restoration time. The restoration priority can assume one of a plurality of values indicating a priority with which a given virtual circuit is restored (e.g., should lower-priority virtual circuits be deprovisioned). Other parameters and parameter structures will be apparent to those of skill in the art, as will the fact that such service parameters may be varied from time-to-time, under user control or automatically (under the control of one or more network components). Certain of such parameters will be described subsequently in the discussion regarding service type definition.

The process of FIG. 14 begins by determining the period of time between the receipt of the service request to the time that the virtual circuit is available for use by the user, referred to herein as the requested provisioning time. In a network employing network elements such as router 100, this provisioning time can be as little as about 50 ms or less (depending on the network elements' capabilities). Next, a determination is made as to the requested latency time (step 1410). The requested level of availability for the virtual circuit is then determined (step 1420). A user may specify one or more restoration parameters which are later used in restoring the virtual circuit in the event of a network failure affecting that virtual circuit (step 1430).

The user may specify other parameters when requesting the provisioning of a new virtual circuit. Among these parameters are the bandwidth necessary to support the traffic expected by the user (step 1440), the maximum length of the circuit to be created (step 1450), the maximum number of hops of which the physical circuit that is created may consist (step 1460), and other QoS parameters as defined by the service provider (step 1470). Any of the preceding parameters may be specified separately, and, in fact, the required bandwidth will likely be so specified.

Figure 15:
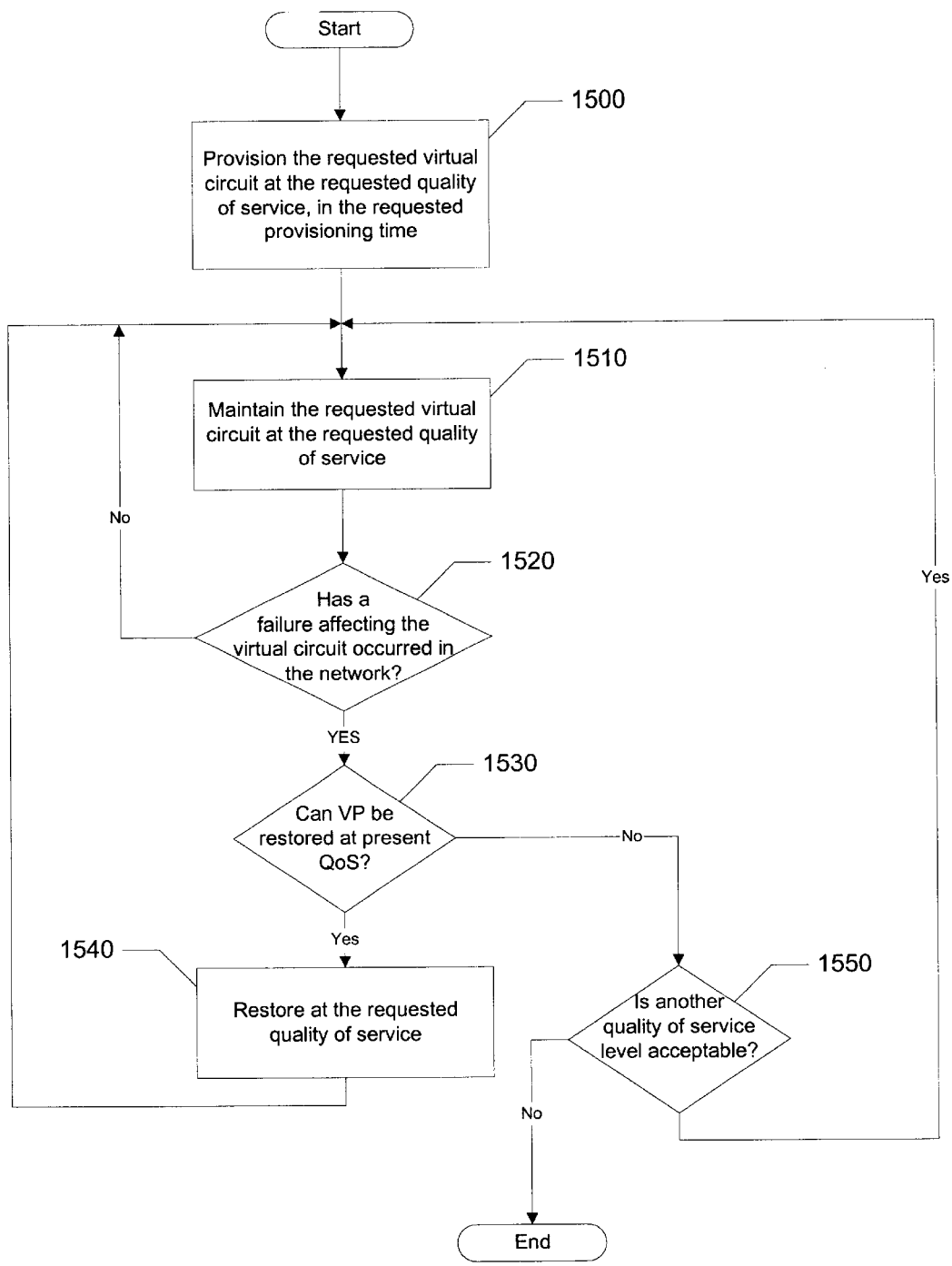
FIG. 15 illustrates an example of a method of restoring a virtual circuit based on end-user requests.

FIG. 15 illustrates the process undertaken when servicing a request for virtual circuit, once one or more acceptable physical circuits have been identified. Such servicing includes provisioning the requested virtual circuit, maintaining the requested virtual circuit with the desired latency time and level of availability, and restoring the requested virtual circuit using the desired restoration parameters, in the event of a failure in the network affecting the virtual circuit. In such a scenario, the virtual circuit is provisioned by configuring a physical circuit between the first and second nodes within the provisioning time. The physical circuit can be configured by, for example, automatically identifying intermediary nodes, if the physical circuit includes any such intermediary nodes, and configuring the first, second, and any intermediary nodes forming the physical circuit.

FIG. 15 thus illustrates the process of servicing the request (illustrated in FIG. 13 as step 1340). The process of FIG. 15 begins with the provision of the requested virtual circuit at the requested QoS level (or with the requested QoS parameters) within the requested provisioning time (1500).

A method according to the present invention supports several path provisioning techniques, including manual and fully automatic path provisioning. Manual provisioning allows a user to build the entire path between the source and destination, provisioning the intermediate nodes and links one at a time. When automatically provisioning a virtual circuit, the user enters the source and destination nodes by, for example, either entering the node-IDs, choosing from a list, or by selecting the nodes using a GUI. The user then enters the desired number of wavelengths for the path. This number is used when the automatic mode is selected for provisioning the switch ports at the source and destination nodes.

A switch port is the port assigned for the wavelength. The switch port assignment indicates the ports provisioned on router 100 specifically for the wavelengths requested by the user. In one embodiment, router 100 automatically assigns the appropriate number of ports to the user based on the number of wavelengths requested. Automatic provisioning allows a user to simply select the source and destination nodes, and leave the provisioning of intermediate nodes (and links) to the network. The latter is the preferable method for provisioning a virtual circuit.

Switch port provisioning can also be performed manually or automatically. When manually provisioning switch ports, the user provisions the desired switch ports at the source and destination. The user selects the switch ports for the source and the destination nodes by choosing from a list of available switch ports or by clicking on a graphical representation of the switch ports. In automatic mode, the user selects the source and destination nodes and the switch ports are provisioned automatically based on the number of wavelengths desired. Again, the latter is the preferable method.

A link must normally be provisioned as well. A link is a connection between two nodes (e.g., routers such as router 100), and can include as little as one wavelength between two nodes or as many as are contained in a conduit between the nodes (i.e., containing multiple fibers with multiple wavelengths on each fiber). A link may employ any subset of I/O ports between two nodes. There can be multiple numbers of links between any pair of nodes, although no overlapping of links is normally permitted (i.e., two links cannot contain the same wavelength or channel).

Several parameters can be used to define a link. These parameters can include, for example, node IDs, switch ports, failure probability, cost distance, and link diversity, among other possible such parameters. To identify the "from" node, the user enters the node ID of the node at one end of the link, selects that node from a list, or uses a GUI to identify the node. It will be noted that it is possible to identify either end of a link or circuit as the "from" or "to" node, and that this convention is employed primarily to support concepts used in failure detection and recovery.

The user then enters one or more switch ports that are assigned to that link. The user can select from a list of available switch ports or select the switch ports using a GUI. Next, the user identify the "to" node by enters the node ID of the other end of the link (or selects the node from a list, or uses a GUI to select the node). The user enters one or more switch ports that are assigned to that link. The user can select from a list of available switch ports or select the switch ports using a GUI. The number of switch ports entered should match that entered for the other end of the link.

The user can enter a probability of failure value of between 0 and 1 ($0<\rho<1$), if the probability of failure is known. Alternatively, the user can enter the distance of the link (e.g., in km), in which case the system calculates the probability of failure for the link based on an average number of fiber cuts per unit distance per unit time (e.g., the U.S. national average number of fiber cuts per 1000 km per year). Another alternative is for the user to enter the average number of fiber cuts unit time (e.g., per year) for the given link. Using this approach, the system then calculates the probability of failure (in a day) as the number of fiber cuts per year divided by 365 (days in a year). Although not stated specifically, these calculations normally also include other failures occurring along a given circuit, including failures in routers, amplifiers, and other network components.

The user can also indicate cost, distance, link diversity, and other parameters. Cost is normally given in terms of relative cost (comparing one link to another) and can range, for example, from a value of 1 to 10, with 1 being the lowest cost and 10 being the highest cost. The user can also input a distance value (e.g., in km) and the system will use this to calculate relative latency. If the distance has already been entered (e.g., to calculate the probability of failure), that same number can be used without the user having to re-supply. Link diversity is defined as physical diversity from other links, such that damage to one link does not imply damage to another, diverse link. Two links are considered non-diverse if the links are both subject to damage from the same physical event (e.g., a cut, node failure, or the like), even if the following conditions exist: the links employ different wavelengths on the same fiber, the links employ different fibers in the same sheath, or the links employ different fiber sheaths in the same conduit. Normally, links are considered diverse only if they are routed over different geographical routes or segments. The user can select links based on their diversity, in order to improve the survivability of a given VP or set of VPs.

Once the virtual circuit has been provisioned, a network such as described herein maintains virtual circuit a the requested QoS, including the desired latency time and with the desired availability (step 1510). If a failure affecting the virtual circuit occurs in the network (step 1520), the service provider attempts to restore the virtual circuit at its present QoS (step 1530). If the service provider is successful in restoring the virtual circuit at the requested QoS (step 1540), the network returns to maintaining the virtual circuit at this QoS (step 1510). If the service provider is not successful at restoring the virtual circuit with the present QoS, the service provider then determines if another QoS level (or different values for the stated QoS parameters) would be acceptable (step 1550). This may entail discussions with the user, referral to alternative QoS levels (or QoS parameters), or other mechanism to determine such alternatives. If the virtual circuit can be restored using these alternative parameters (or alternative QoS levels), the restored virtual circuit is maintained at the newly-requested QoS (step 1510). Otherwise, the virtual circuit is not restored.

Service Type Creation

A service type is made up of a combination of parameters such as initiation, availability, latency, diversity, restoration, and the like. Virtual circuits can be provisioned and sold at different billing rates depending on the level of service needed, based on the QoS parameters selected for the given service type.

A service type name is a name assigned by the user for this service type, and is used when provisioning the VP. The service type can be one of a number of default service types, the name of a previously created custom service type, or a new name. If the service type is new, the user is prompted to create the service type using service type provisioning parameters. Initiation can be specified as being immediate (even within a matter of milliseconds), to an extended period measured in days, weeks, or months, as is appropriate to the user's needs and budget.

Availability can be defined in terms of the percentage amount over 99% availability (e.g., 99.xxxxx%). A user inputs the minimum required availability desired for a given VP as a percentage over a one year period. The probability of failure information can be obtained, for example, from link provisioning information. The system calculates availability by an equation such as the following:

$$VP_{availability} = [(S) - (P*D*R)]/S$$

where S is the number of seconds in a year (($60 \times 60 \times 24 \times 365$)=31,536,000), P is the sum of the probability of failures of the links in the given VP ($\rho_{link\_1} + \rho_{link\_2} + \ldots + \rho_{link\_N}$), D is the number of days in a year (365), and R is the restoration time for the VP upon a failure.

For example, a VP might be made up of link_1, link_2, and link_3. If:

a) Link_1 has a probability of failure=0.01 in a given day,
b) Link_2 has a probability of failure=0.02 in a given day,
c) Link_3 has a probability of failure=0.03 in a given day,
and the VP has a restoration time of 100 ms, the VP's availability is:

$$VP_{availability} = [31536000 - ((0.01+0.02+0.03) \times 365 \times 0.1)]/31536000 = 99.9999931\%$$

Latency tolerance is given in terms of a percentage representing the percentage of paths having better latencies. The user inputs latency tolerance required for given path as a relative percentage. If zero is entered, the path found with the best possible latency is used. The user can also specify a diverse path count (e.g., using a value of 1 or 2). The user inputs whether a single path or two completely diverse paths are required. Two paths are diverse only if they travel on separate geographical links. If the diverse path count is one, then accessible paths must be one. If the diverse path count is two, then the accessible paths parameter can be either one or two. This defines whether the customer has access to one path or both paths when using two diverse paths. The user also enters a time-of-day value, indicating whether or not the given service is a "time of day" service (i.e., if the service is to be made available during only a part of the day). The service time parameter indicates the time of day that the service is active. The user inputs the hours of the day that the service is active (e.g., 24 hours/day is considered always active)

In defining a service type, the user also designates a restoration method. Examples of restoration methods include fast reserved, fast dynamic, medium dynamic, and auto re-provision. This example assumes a network supporting four quality-of-service levels (0–3, with 0 being the highest priority and 3 being the lowest priority). If a fast reserved restoration method is chosen, a dedicated backup path is used for restoration. The dedicated backup path is preferably a VP that is geographically diverse from the original VP and reserved solely for use in restoring the original VP in the event of a failure. This is the least efficient in terms of bandwidth usage, but provides a high level of reliability (and so, cost). This corresponds to quality-of-service level 0 (QoS0), with a restoration time of about 50 ms or less. A fast dynamic restoration method corresponds to quality-of-service level 1 (QoS1), with a restoration time of about 100 ms or less. A medium dynamic restoration method corresponds to quality-of-service level 2 (QoS2), with a restoration time of about 150 ms or less. An auto re-provision restoration method corresponds to quality-of-service level 3 (QoS3), with a restoration time of up to about 1 second. As will be apparent to one of skill in the art, other restoration levels/times can also be specified, such as one minute, one hour, best effort, and so on.

It will also be noted that higher availability (e.g., improved probability of successful restoration and lower restoration time) can also be achieved using dual VP provisioning. By provisioning one or more backup VPs for use as a restoration path for a given VP, the original VP can rely (to a certain extent) on the backup VP(s) to provide fast restoration, merely by the backup VP(s) being available for use in restoring the original VP. Although this technique improves the restoration performance of the original VP by providing one or more alternate VPs that traffic can be routed over, each VP (original and backup) is still subject to its own restoration parameters. In fact, the situation may occur where the original VP can restore itself as fast (or even faster) than by switching to a backup VP. The backup VP(s) may also be restored more quickly than the traffic can be switched to another backup VP. Alternatively, this technique also makes possible gradations in service by varying the number of backup VPs and adjusting the restoration time of each VP (original and backup). For example, the combination of an original VP and multiple backup VPs with relatively slow restoration times may provide service comparable to a similar service employing fewer backup VPs, but with each VP having faster restoration times (although at different costs). The amount of diversity between the original and backup VPs, and between the backup VPs can also be altered to provide varying immunity to failures (at varying costs).

Another service type parameter that may be defined is restoration preemption. Normally, for restoration purposes, available paths are always searched for and used first prior to using preemption of another path. Preemption values indicate whether the virtual circuit in question and/or other virtual circuits can be pre-empted (i.e., deprovisioned or deallocated), and include whether the virtual circuit may be pre-empted, and whether the virtual circuit can pre-empt other virtual circuits. Exemplary combinations include:

1. Can pre-empt, can be pre-empted—The path can pre-empt other paths, and can be pre-empted by other paths for restoration.
2. Can pre-empt, cannot be pre-empted—The path can pre-empt other paths, but cannot be pre-empted by other paths for restoration.
3. Cannot pre-empt, can be pre-empted—The path cannot pre-empt other paths but can be pre-empted by other paths for restoration.
4. Cannot, can't be pre-empted—The path cannot pre-empt other paths, and cannot be pre-empted by other paths for restoration.

The user can also specify network resource usage. In the event that multiple paths are found that meet the specified criteria, the various resource usage priorities can be used to locate to appropriate service path: cost, load leveling, hop count, and latency. Network resource usage can be based on cost, in which case the path with the least cost is chosen. This is the sum of the link costs that make up the path, which are assigned during link provisioning. Network resource usage can also be based on load leveling, in which case the path with the highest percentage of available bandwidth is chosen. This is the sum of the percentages of available bandwidth of the links that make up the paths. Hop count can also be used to control network resource usage, in which case the path that traverses the least amount of links is chosen. Network resource usage can also be based on latency, in which case the path with the lowest delay time is chosen. This is calculated from the sum of the distances of the links that make up the path.

After several restoration events or capacity changes caused by new provisioning actions, a network may not be optimized as it was upon initial provisioning. Certain embodiments of the present invention provide an optimization wizard to address this possibility. A user has the ability to periodically optimize the network based on the initial parameters set during provisioning. A programmatic construct such as an optimization wizard can be employed by a user as needed to determine better ways to provision the network. The user selects from a number of optimizations that can include, for example, optimize path, optimization network, or service type. Such path optimization allows a user to enter a path name or select the path from a GUI. The optimization wizard then searches for a better way to provision that path based on the initial provisioning criteria and network resource usage prioritization. If a better way is found, the user is prompted to initiate change or cancel. Once the change is either completed or canceled, the user is then requested to select another path.

Network optimization allows a user to optimize the virtual circuits of a given network. The optimization wizard looks at virtual circuits in the network and searches for better ways to provision them based on initial provisioning criteria and network resource usage prioritization. Virtual circuits found needing changes are listed for the user. The user then selects the paths to optimize and either confirms/initiates the changes, or cancels the changes. When all path changes have been completed, the user indicates that network optimization is complete.

For an optimize service type, the user enters the service type name for optimization. The optimization wizard examines all paths in the network with that service type and searches for better ways to provision based on the initial provisioning criteria and network resource usage prioritization. All paths requiring changes are listed. The user selects the paths to optimize and either confirms/initiates the change, or cancels the change. When the path changes have been completed, the user is prompted to either select another service type or select DONE.

Using QoS parameters such as those described above, a number of service types can be defined. Table 1 illustrates six exemplary service types that vary in application depending in large part on the importance and time sensitivity of the data being transferred. As the service type becomes less mission-critical, the cost of the service is reduced accordingly. For example, the cost of the second three services in Table 1 would be expected to be less than that of the first three services listed.

TABLE 1

Certain of the possible service type and their QoS parameter values.

| SERVICE TYPE | INITIATION | AVAILABILITY | LATENCY | RESTORATION |
|---|---|---|---|---|
| Mission-Critical Voice/Video/Data | On-the-spot initiation | Guaranteed availability | Least latency possible | Within 50 ms; 100% restoration with latency guarantee |
| Premium Intranet | n day initiation | Guaranteed availability | Lowest latency available | Within 50 ms; 100% restoration with latency guarantee |
| Premium Time-of-Day | On-the-spot initiation | Trading hours availability | Least latency possible | Within 50 ms; 100% restoration with latency guarantee |
| Public Internet Backbone | n day initiation | Guaranteed availability | Best-effort latency | Within 50 ms; 100% restoration with latency guarantee |
| Disaster Recovery | n day initiation | Evening, nights availability | Best-effort latency | Within 50 ms; 100% restoration with latency guarantee |
| Bulk, Non-Mission Critical | n day initiation | Best-effort availability | Best-effort latency | no restoration guarantee, no latency guarantee |

The first service type, mission-critical voice/video/data service, requires highly reliable and uninterrupted service. Such applications include the transfer of financial data, video conferencing, voice transmission for emergency purposes and other such applications. As a result of the time sensitivity of such applications, initiation should commence immediately, if needed. The availability of such service, given the critical nature of such applications, should be guaranteed by using the least latency that the network is capable of achieving. In the event of a failure, restoration should be quick (e.g., a value which will not lead to dropped communications (e.g., 50 ms)) with complete restoration of the virtual circuit and a latency guarantee of the restored virtual circuit. The provision and restoration of such services comprehends deallocating lower priority virtual circuits, if that becomes necessary in order to provide the necessary bandwidth.

In contrast, a virtual circuit with a premium intranet service type does not require immediate initiation. Given that an intranet will normally carry information important to the business or other organization, the intranet's availability is guaranteed, however. Because the operation of the intranet is not as time critical as, for example, mission-critical voice/video/data, merely the lowest latency available provides acceptable performance. The difference between least latency possible and lowest latency available is the fact that other virtual circuits will not be deallocated in order to provision a "lowest latency available" virtual circuit. Given the premium nature of such a service, restoration is again expected to be quick (e.g., within 50 ms) with complete restoration and a guaranteed maximum latency. Again, the deallocation of lower-priority virtual circuits may be mandated, depending upon the user's desires and the costs involved. A premium time-of-day service can be provided with quick initiation and availability during, for example, trading hours. Such a service allows entities having communication needs that are well-defined in terms of time and duration to purchase communication services that are tailored to those needs. As with premium intranet service, the latency and restoration parameters are selected to provide high-quality, reliable service.

As with other, less critical service types, a public internet backbone service type provides an n day initiation and best-effort latency. This is because the users of such a service normally need 24 hour availability, but such service is normally not offered to such users until the service is up and running. Availability of such a service is normally guaranteed, as is restoration (which is normally transparent to the user). Similarly, a disaster recovery service does not require immediate initiation and can accept best-effort latency on the provisioned virtual circuit. To reduce costs, availability can be limited to certain night time hours (e.g., "off-peak" hours). Given that disaster recovery, once begun, should proceed to completion, quick, complete restoration with a guaranteed latency is required. The least critical service type described in Table 1 is bulk, non-mission critical service, which can be used, for example, to transport back-up data from one data center to another. Given the low importance of such service and the lack of time sensitivity, immediate initiation is not required, and best effort availability and latency is sufficient. Likewise, there is no restoration guarantee and no guaranteed latency of the restored virtual circuit. While such a service provides only a minimum of reliability and throughput, and can be subject to deallocation by higher-priority services, the cost of such a service would be relatively low.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims.

What is claimed is:

1. A method of providing network services comprising:
   receiving a request for a virtual circuit between a first node and a second node in a network, wherein:
   said network includes a plurality of nodes that includes said first and said second nodes, each one of said plurality of nodes being coupled to at least one other of said plurality of nodes by at least one of a plurality of optical links, said network supports a plurality of virtual circuits, and said request specifies a quality of service of said virtual circuit;

determining if said network can support said virtual circuit at said quality of service; and servicing said request, if said network can support said virtual circuit, wherein said quality of service is defined by a set of parameters that includes:
- a provisioning time, said virtual circuit to be provisioned within said provisioning time;
- a latency time, information to be communicated between said first and said second nodes in a period of time no greater than said latency time;
- a level of availability; and
- at least one restoration parameter.

2. The method of claim 1, wherein said network is configured to allow said provisioning time to be less than 1 second.

3. The method of claim 1, wherein said network is configured to allow said provisioning time to be as little as 50 ms.

4. The method of claim 1, wherein said latency time can assume one of a plurality of values, said plurality of values comprising:
- a least possible latency time, said least possible latency time being a lowest latency time that said network is configured to provide,
- a minimum available latency time, said minimum available latency time being a lowest latency time that said network can provide without deprovisioning any of said virtual circuits, and
- a maximum latency time.

5. The method of claim 1, wherein said level of availability comprises:
- an up-time parameter, said up-time parameter specifying at least one period of time during which said virtual circuit exists and is available for use; and
- a scheduling parameter.

6. The method of claim 5, wherein said up-time parameter can assume one of a plurality of values, said plurality of values comprising:
- a guaranteed availability value that indicates said virtual circuit is to be available for a substantial portion of said at least one period, and
- a best-efforts availability that indicates said virtual circuit is to be available for at least a minimum portion of said at least one period.

7. The method of claim 5, wherein said scheduling parameter specifies a schedule of times at which and dates on which said virtual circuit will be available for use.

8. The method of claim 5, wherein said scheduling parameter specifies at least one period of time per day during which said virtual circuit is available for use, said at least one period of time per day commencing at a specified time of day.

9. The method of claim 5, wherein said scheduling parameter specifies at least one period of time per day during which said virtual circuit is available for use, said at least one period of time per day commencing on at least one specified day-of-the-week.

10. The method of claim 1, wherein said at least one restoration parameter, includes at least one of:
- a restoration time, said restoration time being a time within which said virtual circuit is to be restored in response to a failure in said network affecting said virtual circuit;
- a restored latency time, said restored latency time being a latency time to be exhibited by said virtual circuit once said virtual circuit is restored in response to said failure; and
- a restoration priority.

11. The method of claim 10, wherein said restoration time can assume one of a plurality of values, said plurality of values including about 50 ms, about 250 ms, and a maximum restoration time.

12. The method of claim 10, wherein said restored latency time can assume one of a plurality of values, said plurality of values comprising:
- a least possible restored latency time, said least possible restored latency time being a lowest latency time that said network is configured to provide,
- a minimum available restored latency time, said minimum available restored latency time being a lowest latency time that said network can provide without deprovisioning any of said virtual circuits, and
- a best-effort restored latency time, said best-effort restored latency time being a latency that is under a maximum value.

13. The method of claim 10, wherein said restoration priority can assume one of a plurality of values, each one of said plurality of values indicating a priority with which a given virtual circuit is restored.

14. The method of claim 1, wherein said set of parameters further includes:
- a requested bandwidth;
- a requested maximum length; and
- a requested maximum number of hops.

15. The method of claim 1, wherein said servicing comprises:
- provisioning said virtual circuit within said provisioning time by configuring a physical circuit between said first and said second nodes within said provisioning time, wherein said physical circuit is configured by:
  - automatically identifying intermediary nodes of said plurality of nodes comprising said physical circuit, if said physical circuit includes any intermediary nodes, and
  - configuring said first, said second, and said intermediary nodes, if any;
- maintaining said virtual circuit with said latency time and level of availability; and
- restoring said virtual circuit using said at least one restoration parameter, in response to a failure in said network affecting said virtual circuit.

16. A method of providing network services comprising:
- receiving a request for a virtual circuit between a first node and a second node in a network, said receiving comprising:
  - determining a desired provisioning time, said virtual circuit to be provisioned within said desired provisioning time, wherein:
    - said network is configured such that a minimum value of said desired provisioning time can be less than about 1 second, and
    - said network includes a plurality of nodes including said first and said second nodes, each one of said plurality of nodes being coupled to at least one other of said plurality of nodes by at least one of a plurality of optical links; and
- servicing said request.

17. The method of claim 16, wherein said network is configured such that said minimum value can be as little as about 50 ms.

18. The method of claim 16, wherein said receiving further comprises:
   determining a desired latency time, information to be communicated between said first and said second nodes in a period of time no greater than said desired latency time;
   determining a desired level of availability, said desired level of availability specifying at least one period of time during which said virtual circuit is available for use; and
   determining a desired restoration time, said desired restoration time being a period of time within which said virtual circuit is restored in response to a failure in said network affecting said virtual circuit.

19. The method of claim 18, wherein said desired level of availability specifies at least one period of time per day during which said virtual circuit is available for use, said at least one period of time per day commencing at a specified time of day.

20. The method of claim 18, wherein said servicing comprises:
   provisioning said virtual circuit by configuring a physical circuit between said first and said second nodes within said desired provisioning time, wherein said physical circuit is configured by:
      automatically identifying intermediary nodes of said plurality of nodes comprising said physical circuit, if said physical circuit includes any intermediary nodes, and
      configuring said first, said second, and said intermediary nodes, if any;
   maintaining said virtual circuit with said desired latency time and said desired level of availability; and
   restoring said virtual circuit within said desired restoration time, in response to a failure in said network affecting said virtual circuit.

21. The method of claim 20, wherein said virtual circuit is one of a plurality of virtual circuits affected by said failure, each one of said plurality of virtual circuits having a corresponding priority, and said restoring further comprises:
   attempting to restore said plurality of virtual circuits based on said corresponding priority of said each one of said plurality of virtual circuits.

22. The method of claim 20, wherein each one of said priorities is based on a quality-of-service level.

23. The method of claim 16, wherein said servicing comprises:
   provisioning said virtual circuit by configuring a physical circuit between said first and said second nodes within said desired provisioning time, wherein said physical circuit is configured by:
      automatically identifying intermediary nodes of said plurality of nodes comprising said physical circuit, if said physical circuit includes any intermediary nodes, and
      configuring said first, said second, and said intermediary nodes, if any.

24. A method of providing network services comprising:
   receiving a request for a virtual circuit between a first node and a second node in a network, said receiving comprising:
      determining a desired restoration time, said desired restoration time being a period of time within which said virtual circuit is restored in response to a failure in said network affecting said virtual circuit, wherein:
         said network is configured such that a minimum value of said desired restoration time can be less than about 1 second,
         a redundant capacity of said network is less than a maximum capacity of said network, and
         said network includes a plurality of nodes including said first and said second nodes, each one of said plurality of nodes being coupled to at least one other of said plurality of nodes by at least one of a plurality of optical links; and
   servicing said request.

25. The method of claim 24, wherein said network is configured such that said minimum value of said desired restoration time can be as little as about 50 ms.

26. The method of claim 24, wherein said desired restoration time is measured from a point in time at which said failure occurs.

27. The method of claim 24, wherein said receiving further comprises:
   determining a desired provisioning time, said virtual circuit to be provisioned within said desired provisioning time;
   determining a desired latency time, information to be communicated between said first and said second nodes in a period of time no greater than said desired latency time; and
   determining a desired level of availability, said desired level of availability specifying at least one period of time during which said virtual circuit is available for use.

28. The method of claim 27, wherein said desired level of availability specifies at least one period of time per day during which said virtual circuit is available for use, said at least one period of time per day commencing at a pre-specified time of day.

29. The method of claim 27, said servicing comprising:
   provisioning said virtual circuit by configuring a physical circuit between said first and said second nodes within said desired provisioning time, wherein said physical circuit is configured by:
      automatically identifying intermediary nodes of said plurality of nodes comprising said physical circuit, if said physical circuit includes any intermediary nodes, and
      configuring said first, said second, and said intermediary nodes, if any; and
   maintaining said virtual circuit with said desired latency time and said desired level of availability.

30. The method of claim 29, said servicing further comprising:
   restoring said virtual circuit within said desired restoration time, in response to a failure in said network affecting said virtual circuit.

31. The method of claim 29, wherein said network is configured such that said desired restoration time can be as little as about 50 ms.

32. The method of claim 31, wherein said virtual circuit is one of a plurality of virtual circuits affected by said failure, each one of said plurality of virtual circuits having a corresponding priority, and said restoring further comprises:
   attempting to restore said plurality of virtual circuits based on said corresponding priority of said each one of said plurality of virtual circuits.

33. The method of claim 32, wherein each one of said priorities is based on a quality-of-service level.

34. A method of providing network services comprising:
   receiving a plurality of requests, wherein
      each one of said plurality of requests is a request for a corresponding virtual circuit,
      each one of said corresponding virtual circuits is between a corresponding first node and a corresponding second node of a plurality of nodes, said corresponding first and said corresponding second nodes corresponding to said one of said corresponding virtual circuits, and each one of said plurality of nodes is coupled to at least one other of said plurality of nodes by at least one of a plurality of optical links to form a network;

servicing said plurality of requests by determining, for each one of said plurality of requests:

a desired provisioning time for said corresponding virtual circuit, said corresponding virtual circuit to be provisioned within said desired provisioning time of receiving said one of said plurality of requests by configuring a corresponding physical circuit between said corresponding first and said corresponding second nodes, wherein said corresponding physical circuit is configured by:

automatically identifying corresponding intermediary nodes of said plurality of nodes comprising said corresponding physical circuit, if said corresponding physical circuit includes any intermediary nodes, and configuring said corresponding first, said corresponding second, and said corresponding intermediary nodes, if any, a desired latency time for said corresponding virtual circuit, information to be communicated between said corresponding first and said corresponding second nodes in a period of time no greater than said desired latency time, a desired level of availability for said corresponding virtual circuit, and a desired restoration time for said corresponding virtual circuit, said desired restoration time being a period of time required to restore said corresponding virtual circuit in response to a failure in said corresponding physical circuit;

provisioning certain ones of said virtual circuits within said desired provisioning time;

maintaining said certain ones of said virtual circuits with said desired latency time and said desired level of availability; and restoring failed ones of said certain ones of said virtual circuits within said desired restoration time, in response to a failure in said network affecting said virtual circuit.

35. The method of claim 34, wherein said network is configured to provision said certain ones of said virtual circuits at a rate of up to about 10 virtual circuits per second.

36. The method of claim 34, wherein said network is configured to restore said failed ones of said certain ones of said virtual circuits at a rate of up to about 10 virtual circuits per second.

37. The method of claim 36, wherein each one of said virtual circuits is assigned a corresponding priority, and said restoring of said failed ones of said certain ones of said virtual circuits is based on said corresponding priorities.

38. The method of claim 37, wherein each one of said corresponding priorities is based on a quality-of-service level.

39. The method of claim 38, wherein said network is further configured such that a minimum value of said desired restoration time can be as little as about 50 ms.

40. The method of claim 39, wherein said desired provisioning time is measured from a point in time at which said request is received.

41. A computer system comprising:

a processor coupled to a first node in a network, wherein said network includes a plurality of nodes that includes said first node and a second node, each one of said plurality of nodes being coupled to at least one other of said plurality of nodes by at least one of a plurality of optical links, and said network supports a plurality of virtual circuits;

computer readable medium coupled to said processor; and computer code, encoded in said computer readable medium, configured to cause said processor to:

receive a request for a virtual circuit between said first and said second nodes, wherein said request specifies a quality of service of said virtual circuit;

determine if said network can support said virtual circuit at said quality of service; and service said request, if said network can support said virtual circuit wherein said quality of service is defined by a set of parameters that includes:

a provisioning time, said virtual circuit to be provisioned within said provisioning time;

a latency time, information to be communicated between said first and said second nodes in a period of time no greater than said latency time;

a level of availability; and at least one restoration parameter.

42. The computer system of claim 41, wherein said network is configured to allow said provisioning time to be less than 1 second.

43. The computer system of claim 41, wherein said network is configured to allow said provisioning time to be as little as 50 ms.

44. The computer system of claim 41, wherein said latency time can assume one of a plurality of values, said plurality of values comprising:

a least possible latency time, said least possible latency time being a lowest latency time that said network is configured to provide, a minimum available latency time, said minimum available latency time being a lowest latency time that said network can provide without deprovisioning any of said virtual circuits, and a maximum latency time.

45. The computer system of claim 41, wherein said level of availability comprises:

an up-time parameter said up-time parameter specifying at least one period of time during which said virtual circuit exists and is available for use; and a scheduling parameter.

46. The computer system of claim 45, wherein said up-time parameter can assume one of a plurality of values, said plurality of values comprising:

a guaranteed availability value that indicates said virtual circuit is to be available for a substantial portion of said at least one period, and a best-efforts availability that indicates said virtual circuit is to be available for at least a minimum portion of said at least one period.

47. The computer system of claim 45, wherein said scheduling parameter specifies a schedule of times at which and dates on which said virtual circuit will be available for use.

48. The computer system of claim 45, wherein said scheduling parameter specifies at least one period of time per day during which said virtual circuit is available for use, said at least one period of time per day commencing at a specified time of day.

49. The computer system of claim 45, wherein said scheduling parameter specifies at least one period of time per day during which said virtual circuit is available for use, said at least one period of time per day commencing on at least one specified day-of-the-week.

50. The computer system of claim 41, wherein said at least one restoration parameter, includes at least one of:
a restoration time, said restoration time being a time within which said virtual circuit is to be restored in response to a failure in said network affecting said virtual circuit;
a restored latency time, said restored latency time being a latency time to be exhibited by said virtual circuit once said virtual circuit is restored in response to said failure; and
a restoration priority.

51. The computer system of claim 50, wherein said restoration time can assume one of a plurality of values, said plurality of values including about 50 ms, about 250 ms, and a maximum restoration time.

52. The computer system of claim 50, wherein said restored latency time can assume one of a plurality of values, said plurality of values comprising:
a least possible restored latency time, said least possible restored latency time being a lowest latency time that said network is configured to provide,
a minimum available restored latency time, said minimum available restored latency time being a lowest latency time that said network can provide without deprovisioning any of said virtual circuits, and
a best-effort restored latency time, said best-effort restored latency time being a latency that is under a maximum value.

53. The computer system of claim 50, wherein said restoration priority can assume one of a plurality of values, each one of said plurality of values indicating a priority with which a given virtual circuit is restored.

54. The computer system of claim 41, wherein said set of parameters further includes:
a requested bandwidth;
a requested maximum length; and
a requested maximum number of hops.

55. The computer system of claim 41, wherein said computer code configured to cause said processor to service said request further comprises computer code configured to cause said processor to:
provision said virtual circuit within said provisioning time by configuring a physical circuit between said first and said second nodes within said provisioning time, wherein said physical circuit is configured by:
automatically identifying intermediary nodes of said plurality of nodes comprising said physical circuit, if said physical circuit includes any intermediary nodes, and
configuring said first, said second, and said intermediary nodes, if any;
maintain said virtual circuit with said latency time and level of availability; and
restore said virtual circuit using said at least one restoration parameter, in response to a failure in said network affecting said virtual circuit.

56. A network comprising:
a plurality of nodes that includes a first node and a second node;
a plurality of optical links, wherein
each one of said plurality of nodes is coupled to at least one other of said plurality of nodes by at least one of said plurality of optical links, and
said network supports a plurality of virtual circuits; and
a processor, coupled to said first node, wherein said processor is configured to
provision network services of said network by virtue of being configured to
receive a request for a virtual circuit between said first and said second nodes, wherein said request specifies a quality of service of said virtual circuit,
determine if said network can support said virtual circuit at said quality of service, and
service said request, if said network can support said virtual circuit
wherein said quality of service is defined by a set of parameters that includes:
a provisioning time, said virtual circuit to be provisioned within said provisioning time;
a latency time, information to be communicated between said first and said second nodes in a period of time no greater than said latency time;
a level of availability; and
at least one restoration parameter.

57. The network of claim 56, wherein said network is configured to allow said provisioning time to be less than 1 second.

58. The network of claim 56, wherein said network is configured to allow said provisioning time to be as little as 50 ms.

59. The network of claim 56, wherein said latency time can assume one of a plurality of values, said plurality of values comprising:
a least possible latency time, said least possible latency time being a lowest latency time that said network is configured to provide,
a minimum available latency time, said minimum available latency time being a lowest latency time that said network can provide without deprovisioning any of said virtual circuits, and
at maximum latency time.

60. The network of claim 56, wherein said level of availability comprises:
an up-time parameter, said up-time parameter specifying at least one period of time during which said virtual circuit exists and is available for use; and
a scheduling parameter.

61. The network of claim 60, wherein said up-time parameter can assume one of a plurality of values, said plurality of values comprising:
a guaranteed availability value that indicates said virtual circuit is to be available for a substantial portion of said at least one period, and
a best-efforts availability that indicates said virtual circuit is to be available for at least a minimum portion of said at least one period.

62. The network of claim 60, wherein said scheduling parameter specifies a schedule of times at which and dates on which said virtual circuit will be available for use.

63. The network of claim 60, wherein said scheduling parameter specifies at least one period of time per day during which said virtual circuit is available for use, said at least one period of time per day commencing at a specified time of day.

64. The network of claim 60, wherein said scheduling parameter specifies at least one period of time per day during which said virtual circuit is available for use, said at least one period of time per day commencing on at least one specified day-of-the-week.

65. The network of claim 56, wherein said at least one restoration parameter, includes at least one of:
- a restoration time, said restoration time being a time within which said virtual circuit is to be restored in response to a failure in said network affecting said virtual circuit;
- a restored latency time, said restored latency time being a latency time to be exhibited by said virtual circuit once said virtual circuit is restored in response to said failure; and
- a restoration priority.

66. The network of claim 65, wherein said restoration time can assume one of a plurality of values, said plurality of values including about 50 ms, about 250 ms, and a maximum restoration time.

67. The network of claim 65, wherein said restored latency time can assume one of a plurality of values, said plurality of values comprising:
- a least possible restored latency time, said least possible restored latency time being a lowest latency time that said network is configured to provide,
- a minimum available restored latency time, said minimum available restored latency time being a lowest latency time that said network can provide without deprovisioning any of said virtual circuits, and
- a best-effort restored latency time, said best-effort restored latency time being a latency that is under a maximum value.

68. The network of claim 65, wherein said restoration priority can assume one of a plurality of values, each one of said plurality of values indicating a priority with which a given virtual circuit is restored.

69. The network of claim 56, wherein said set of parameters further includes:
- a requested bandwidth;
- a requested maximum length; and
- a requested maximum number of hops.

70. The network of claim 56, wherein said processor is configured to service said request by virtue of being further configured to:
- provision said virtual circuit within said provisioning time by configuring a physical circuit between said first and said second nodes within said provisioning time, wherein said physical circuit is configured by:
  - automatically identifying intermediary nodes of said plurality of nodes comprising said physical circuit, if said physical circuit includes any intermediary nodes, and
  - configuring said first, said second, and said intermediary nodes, if any;
- maintain said virtual circuit with said latency time and level of availability; and
- restore said virtual circuit using said at least one restoration parameter, in response to a failure in said network affecting said virtual circuit.

71. A computer program product for controlling the provision of network services, said computer program product encoded in computer readable media and comprising:
- a first set of instructions, executable on a computer system, configured to receive a request for a virtual circuit between a first node and a second node in a network, wherein:
  - said computer system is coupled to said first node,
  - said network includes a plurality of nodes that includes said first and said second nodes, each one of said plurality of nodes being coupled to at least one other of said plurality of nodes by at least one of a plurality of optical links,
  - said network supports a plurality of virtual circuits, and
  - said request specifies a quality of service of said virtual circuit;
- a second set of instructions, executable on said computer system, configured to determine if said network can support said virtual circuit at said quality of service; and
- a third set of instructions, executable on said computer system, configured to service said request, it said network can support said virtual circuit wherein said quality of service is defined by a set of parameters that includes:
- a provisioning time, said virtual circuit to be provisioned within said provisioning time;
- a latency time, information to be communicated between said first and said second nodes in a period of time no greater than said latency time;
- a level of availability; and
- at least one restoration parameter.

72. The computer program product of claim 71, wherein said network is configured to allow said provisioning time to be less than 1 second.

73. The computer program product of claim 71, wherein said network is configured to allow said provisioning time to be as little as 50 ms.

74. The computer program product of claim 71, wherein said latency time can assume one of a plurality of values, said plurality of values comprising:
- a least possible latency time, said least possible latency time being a lowest latency time that said network is configured to provide,
- a minimum available latency time, said minimum available latency time being a lowest latency time that said network can provide without deprovisioning any of said virtual circuits, and
- a maximum latency time.

75. The computer program product of claim 71, wherein said level of availability comprises:
- an up-time parameter, said up-time parameter specifying at least one period of time during which said virtual circuit exists and is available for use; and
- a scheduling parameter.

76. The computer program product of claim 75, wherein said up-time parameter can assume one of a plurality of values, said plurality of values comprising:
- a guaranteed availability value that indicates said virtual circuit is to be available for a substantial portion of said at least one period, and
- a best-efforts availability that indicates said virtual circuit is to be available for at least a minimum portion of said at least one period.

77. The computer program product of claim 75, wherein said scheduling parameter specifies a schedule of times at which and dates on which said virtual circuit will be available for use.

78. The computer program product of claim 75, wherein said scheduling parameter specifies at least one period of time per day during which said virtual circuit is available for use, said at least one period of time per day commencing at a specified time of day.

79. The computer program product of claim 75, wherein said scheduling parameter specifies at least one period of time per day during which said virtual circuit is available for use, said at least one period of time per day commencing on at least one specified day-of-the-week.

80. The computer program product of claim 71, wherein said at least one restoration parameter, includes at least one of:
- a restoration time, said restoration time being a time within which said virtual circuit is to be restored in response to a failure in said network affecting said virtual circuit;
- a restored latency time, said restored latency time being a latency time to be exhibited by said virtual circuit once said virtual circuit is restored in response to said failure; and
- a restoration priority.

81. The computer program product of claim 80, wherein said restoration time can assume one of a plurality of values, said plurality of values including about 50 ms, about 250 ms, and a maximum restoration time.

82. The computer program product of claim 80, wherein said restored latency time can assume one of a plurality of values, said plurality of values comprising:
- a least possible restored latency time, said least possible restored latency time being a lowest latency time that said network is configured to provide,
- a minimum available restored latency time, said minimum available restored latency time being a lowest latency time that said network can provide without deprovisioning any of said virtual circuits, and
- a best-effort restored latency time, said best-effort restored latency time being a latency that is under a maximum value.

83. The computer program product of claim 80, wherein said restoration priority can assume one of a plurality of values, each one of said plurality of values indicating a priority with which a given virtual circuit is restored.

84. The computer program product of claim 71, wherein said set of parameters further includes:
- a requested bandwidth;
- a requested maximum length; and
- a requested maximum number of hops.

85. The computer program product of claim 71, wherein said third set of instructions comprises:
- a first subset of instructions, executable on said computer system, configured to provision said virtual circuit within said provisioning time by configuring a physical circuit between said first and said second nodes within said provisioning time, wherein said physical circuit is configured by:
  - automatically identifying intermediary nodes of said plurality of nodes comprising said physical circuit, if said physical circuit includes any intermediary nodes, and
  - configuring said first, said second, and said intermediary nodes, if any;
- a second subset of instructions, executable on said computer system, configured to maintain said virtual circuit with said latency time and level of availability; and
- a third set of instructions, executable on said computer system, configured to restore said virtual circuit using said at least one restoration parameter, in response to a failure in said network affecting said virtual circuit.

* * * * *

UNITED STATES PATENT AND TRADEMARK OFFICE
CERTIFICATE OF CORRECTION

PATENT NO. : 6,912,221 B1
DATED : June 28, 2005
INVENTOR(S) : H. Michael Zadikian et al.

It is certified that error appears in the above-identified patent and that said Letters Patent is hereby corrected as shown below:

<u>Column 36,</u>
Line 39, please replace "at" with -- a --.

<u>Column 38,</u>
Line 11, please replace "it" with -- if --.

Signed and Sealed this

Eighteenth Day of October, 2005

JON W. DUDAS
*Director of the United States Patent and Trademark Office*